(12) United States Patent
Baligh et al.

(10) Patent No.: US 11,368,998 B2
(45) Date of Patent: Jun. 21, 2022

(54) SYSTEM AND METHOD FOR A TRACKING CHANNEL

(71) Applicant: Huawei Technologies Co., Ltd., Shenzhen (CN)

(72) Inventors: Mohammadhadi Baligh, Ottawa (CA); Jianglei Ma, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/735,120

(22) Filed: Jan. 6, 2020

(65) Prior Publication Data

US 2020/0146092 A1     May 7, 2020

Related U.S. Application Data

(63) Continuation of application No. 15/009,626, filed on Jan. 28, 2016, now Pat. No. 10,531,512.

(60) Provisional application No. 62/213,444, filed on Sep. 2, 2015, provisional application No. 62/141,483, filed on Apr. 1, 2015.

(51) Int. Cl.
*H04W 76/25* (2018.01)
*H04W 74/08* (2009.01)
*H04W 8/26* (2009.01)
*H04L 5/00* (2006.01)

(52) U.S. Cl.
CPC .......... *H04W 76/25* (2018.02); *H04W 74/08* (2013.01); *H04L 5/0091* (2013.01); *H04W 8/26* (2013.01)

(58) Field of Classification Search
CPC ....... H04L 1/0031; H04L 1/1896; H04L 5/00; H04L 5/001; H04L 5/0053; H04L 5/0092; H04L 5/0094; H04L 27/0006; H04W 8/02; H04W 8/26; H04W 24/02; H04W 24/10; H04W 64/006; H04W 72/04; H04W 72/0406; H04W 72/042; H04W 72/0453;

(Continued)

(56) References Cited

U.S. PATENT DOCUMENTS 8,238,837 B2 * 8/2012 Womack ........... H04W 72/0413
455/68
8,249,004 B2 * 8/2012 Wang .................... H04L 5/0091
370/329

(Continued)

FOREIGN PATENT DOCUMENTS

AU     2016233832 A1 * 8/2017 ............ H04W 4/025
AU     2016233832 B2 * 6/2020 ........ H04W 72/0486

(Continued)

OTHER PUBLICATIONS

Huawei Technologies Co., Ltd., et al., "NB M2M—Random Access Procedure of MAC Layer", 3GPP TSG GERAN Adhoc#1 on FS_IoT_LC, GPC150040, Agenda Item: 2.4.4, Feb. 2-5, 2015, 8 Pages, Sophia-Antipolis, France.

(Continued)

*Primary Examiner* — Eric Nowlin
(74) *Attorney, Agent, or Firm* — Slater Matsil, LLP

(57) ABSTRACT

A method includes receiving, by a user equipment (UE) from a network node, a UE specific tracking sequence and assigned transmission opportunities and transmitting, by the UE to the network node, the UE specific tracking sequence in accordance with the assigned transmission opportunities.

27 Claims, 9 Drawing Sheets

(58) Field of Classification Search
CPC ... H04W 72/14; H04W 74/08; H04W 76/028; H04W 76/045
See application file for complete search history.

(56) References Cited

U.S. PATENT DOCUMENTS

| | | | | |
|---|---|---|---|---|
| 8,265,682 | B2* | 9/2012 | Bertrand | H04W 52/0225 |
| | | | | 455/522 |
| 8,401,031 | B2* | 3/2013 | Park | H04W 74/006 |
| | | | | 370/431 |
| 8,599,819 | B2 | 12/2013 | Kim et al. | |
| 8,743,791 | B2 | 6/2014 | Nam et al. | |
| 8,797,986 | B2 | 8/2014 | Iwai et al. | |
| 8,817,721 | B2 | 8/2014 | Umesh et al. | |
| 8,964,621 | B2 | 2/2015 | Bachu et al. | |
| 9,155,082 | B2 | 10/2015 | Davydov | |
| 9,398,584 | B2 | 7/2016 | Shen et al. | |
| 9,426,741 | B2* | 8/2016 | Wu | H04W 60/04 |
| 9,445,398 | B2 | 9/2016 | Wang et al. | |
| 9,544,776 | B2 | 1/2017 | Luo et al. | |
| 9,603,091 | B2 | 3/2017 | Baldemair et al. | |
| 9,609,593 | B2* | 3/2017 | Wu | H04W 52/0225 |
| 9,794,101 | B2 | 10/2017 | Peng et al. | |
| 9,794,944 | B2* | 10/2017 | Soriaga | H04W 72/042 |
| 10,033,547 | B2* | 7/2018 | Yin | H04L 12/4633 |
| 10,645,750 | B2* | 5/2020 | Tenny | H04W 72/14 |
| 10,652,851 | B2* | 5/2020 | Vilaipornsawai | H04W 76/27 |
| 10,652,862 | B2* | 5/2020 | Baghel | H04L 67/18 |
| 11,051,277 | B2* | 6/2021 | Baghel | H04L 63/123 |
| 2005/0152303 | A1 | 7/2005 | Li et al. | |
| 2006/0091206 | A1 | 5/2006 | Olsen et al. | |
| 2008/0188219 | A1* | 8/2008 | Fischer | H04W 74/0866 |
| | | | | 455/434 |
| 2009/0088134 | A1* | 4/2009 | Ishii | H04W 12/108 |
| | | | | 455/411 |
| 2009/0121940 | A1 | 5/2009 | Ladd et al. | |
| 2009/0248164 | A1 | 10/2009 | Sweeney | |
| 2010/0272035 | A1 | 10/2010 | Park et al. | |
| 2011/0044269 | A1 | 2/2011 | Fan et al. | |
| 2011/0111751 | A1 | 5/2011 | Markhovsky et al. | |
| 2011/0116436 | A1 | 5/2011 | Bachu et al. | |
| 2011/0237266 | A1* | 9/2011 | Cai | H04W 76/28 |
| | | | | 455/450 |
| 2012/0014343 | A1* | 1/2012 | Womack | H04L 27/2662 |
| | | | | 370/329 |
| 2012/0106489 | A1 | 5/2012 | Konishi et al. | |
| 2012/0134288 | A1 | 5/2012 | Fang et al. | |
| 2012/0163320 | A1 | 6/2012 | Akimoto et al. | |
| 2012/0170497 | A1* | 7/2012 | Zhang | H04W 76/28 |
| | | | | 370/311 |
| 2012/0202558 | A1* | 8/2012 | Hedberg | H04L 5/0048 |
| | | | | 455/550.1 |
| 2013/0039304 | A1 | 2/2013 | Pan et al. | |
| 2013/0058306 | A1 | 3/2013 | Noh et al. | |
| 2013/0077569 | A1 | 3/2013 | Nam et al. | |
| 2013/0077577 | A1 | 3/2013 | Umesh et al. | |
| 2013/0136073 | A1 | 5/2013 | Kato | |
| 2013/0170453 | A1* | 7/2013 | Kim | H04W 74/002 |
| | | | | 370/329 |
| 2013/0182674 | A1 | 7/2013 | Lunttila et al. | |
| 2013/0223362 | A1 | 8/2013 | Alfano et al. | |
| 2013/0244709 | A1 | 9/2013 | Davydov et al. | |
| 2013/0315152 | A1 | 11/2013 | Ratasuk et al. | |
| 2013/0322375 | A1 | 12/2013 | Chang et al. | |
| 2013/0322387 | A1* | 12/2013 | Kim | H04W 72/0413 |
| | | | | 370/329 |
| 2014/0119321 | A1* | 5/2014 | Wang | H04L 5/0094 |
| | | | | 370/329 |
| 2014/0155061 | A1 | 6/2014 | Kherani et al. | |
| 2014/0198701 | A1* | 7/2014 | Ostergaard | H04W 76/20 |
| | | | | 370/311 |
| 2014/0376401 | A1* | 12/2014 | Kanamarlapudi | H04W 72/04 |
| | | | | 370/253 |
| 2014/0376482 | A1* | 12/2014 | Kim | H04L 5/0094 |
| | | | | 370/329 |
| 2015/0003263 | A1 | 1/2015 | Senarath et al. | |
| 2015/0011240 | A1 | 1/2015 | Xiao et al. | |
| 2015/0063128 | A1 | 3/2015 | Garikipati et al. | |
| 2015/0139054 | A1* | 5/2015 | Wu | H04W 52/0212 |
| | | | | 370/311 |
| 2016/0105910 | A1 | 4/2016 | Wang et al. | |
| 2016/0142190 | A1 | 5/2016 | Lunttila et al. | |
| 2016/0150564 | A1 | 5/2016 | Quan et al. | |
| 2016/0270082 | A1* | 9/2016 | Soriaga | H04L 5/0053 |
| 2016/0323887 | A1* | 11/2016 | Patel | H04W 52/365 |
| 2016/0330686 | A1* | 11/2016 | Wu | H04W 60/04 |
| 2016/0352403 | A1 | 12/2016 | Kishiyama et al. | |
| 2017/0034781 | A1* | 2/2017 | Kumar | H04W 52/028 |
| 2017/0086219 | A1* | 3/2017 | Lee | H04W 72/1278 |
| 2017/0311274 | A1 | 10/2017 | Yu et al. | |
| 2020/0214041 | A1* | 7/2020 | Van Phan | H04W 48/14 |
| 2020/0267693 | A1* | 8/2020 | Baghel | H04W 76/12 |
| 2021/0227585 | A1* | 7/2021 | Tsai | H04W 74/0833 |
| 2021/0243812 | A1* | 8/2021 | Agiwal | H04W 74/0833 |
| 2022/0030544 | A1* | 1/2022 | Zhou | H04W 76/27 |

FOREIGN PATENT DOCUMENTS

| | | | | |
|---|---|---|---|---|
| BR | 112017019545 | A2 * | 5/2018 | H04W 72/0486 |
| CN | 101090281 | A | 12/2007 | |
| CN | 101686469 | A | 3/2010 | |
| CN | 101855566 | A | 10/2010 | |
| CN | 101883423 | A | 11/2010 | |
| CN | 102355680 | A | 2/2012 | |
| CN | 102823315 | A | 12/2012 | |
| CN | 103458505 | A * | 12/2013 | H04W 52/0225 |
| CN | 103535096 | A | 1/2014 | |
| CN | 102740420 | B * | 3/2015 | H04W 52/0241 |
| CN | 106358310 | A * | 1/2017 | |
| CN | 107431593 | A * | 12/2017 | H04L 5/0053 |
| CN | 103458505 | B * | 5/2018 | H04W 52/0212 |
| CN | 109756996 | A * | 5/2019 | H04L 5/00 |
| CN | 110557806 | A * | 12/2019 | H04W 76/28 |
| CN | 107431593 | B * | 12/2020 | H04W 4/025 |
| EP | 2849506 | A1 * | 3/2015 | H04W 60/04 |
| EP | 2849506 | A4 * | 11/2015 | H04W 60/04 |
| EP | 3146650 | A1 * | 3/2017 | H04W 72/1278 |
| EP | 3146650 | A4 * | 12/2017 | H04W 72/1278 |
| EP | 3269071 | A1 * | 1/2018 | H04W 72/042 |
| EP | 3491870 | A1 * | 6/2019 | H04W 48/10 |
| EP | 3491870 | A4 * | 6/2019 | H04W 72/14 |
| EP | 2849506 | B1 * | 1/2020 | H04W 52/0225 |
| EP | 3491870 | B1 * | 11/2020 | H04W 76/28 |
| JP | 2012110058 | A | 6/2012 | |
| JP | 2012526425 | A | 10/2012 | |
| JP | 2014057357 | A | 3/2014 | |
| JP | 6795511 | B2 * | 12/2020 | H04W 72/0486 |
| KR | 20130028397 | A | 3/2013 | |
| KR | 20170004962 | A * | 1/2017 | H04W 72/12 |
| KR | 20170130399 | A * | 11/2017 | H04W 72/042 |
| KR | 102065698 | B1 * | 2/2020 | H04W 52/0209 |
| WO | 03081820 | A1 | 10/2003 | |
| WO | WO-2012137033 | A1 * | 10/2012 | H04W 52/0241 |
| WO | 2013061430 | A1 | 5/2013 | |
| WO | WO-2013177992 | A1 * | 12/2013 | H04W 52/0225 |
| WO | 2015013976 | A1 | 2/2015 | |
| WO | WO-2015178566 | A1 * | 11/2015 | H04L 5/0005 |
| WO | WO-2016148831 | A1 * | 9/2016 | H04W 72/042 |
| WO | WO-2019085607 | A1 * | 5/2019 | H04L 1/18 |
| WO | WO-2020102685 | A1 * | 5/2020 | H04W 76/27 |

OTHER PUBLICATIONS

"IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications," IEEE Std 802.11-2012, Mar. 29, 2012, 2,793 pgs.

"IEEE Standard for Information Technology; Telecommunications and Information Exchange Between Systems; Local and Metropoli-

(56) References Cited

OTHER PUBLICATIONS tan Area Networks; Specific Requirements, Paret 11: Wireless LAN Medium Access Control (MAC) and Physical Layer (PHY) Specifications, Amendment 4: Enhancements for Very High Throughput for Operation in Bands below 6 GHz," IEEE Std 802.11ac-2013, Dec. 2013, 425 pgs.
LTE, "3rd Generation Partnership Project; Technical Specification Group Radio Access Network; Evolved Universal Terrestrial Radio Access (E-Utra); Physical channels and modulation (Release)," 3GPP TS 36.211 v12.60.0, Jun. 2015, 136 pgs.

\* cited by examiner

SYSTEM AND METHOD FOR A TRACKING CHANNEL

This application is a continuation of U.S. patent application Ser. No. 15/009,626 filed on Jan. 28, 2016, and entitled "System and Method for a Tracking Channel," which claims the benefit of U.S. Provisional Application No. 62/141,483 filed on Apr. 1, 2015, and entitled "System and Method for a Tracking Channel," and U.S. Provisional Application No. 62/213,444 filed on Sep. 2, 2015, and entitled "System and Method for Tracking Channel Sequence Design," which applications are hereby incorporated herein by reference.

TECHNICAL FIELD

The present invention relates to a system and method for wireless communications, and, in particular, to a system and method for a tracking channel.

BACKGROUND

In a fifth generation (5G) long term evolution (LTE) wireless communications system, a user equipment (UE) may enter a standby mode (which may also be referred to as eco mode or battery saving mode), which facilitates fast wake-up and tracking compared to an idle mode (which may be used in access networks such as LTE). In radio access virtualization, a UE registers to the network, not to a particular cell.

UE connection and identification may present challenges as nodes become dense and virtualized. The density of nodes, including network nodes, UEs, sensors, and other devices is increasing. Also, with virtualization, a UE may connect to a network, not to a particular cell. There may be a high rate of handovers in coverage areas with low power nodes. Also, it is desirable to have a fast wakeup time, which may lead to lower synchronization and reconnection times. A fast wakeup time may involve a standby mode, where a UE retains its connection to its network, along with its UE identification (ID) and UE specific sequence for quick reestablishment of data transfer.

SUMMARY

An embodiment method includes receiving, by a user equipment (UE) from a network node, a UE specific tracking sequence and assigned transmission opportunities and transmitting, by the UE to the network node, the UE specific tracking sequence in accordance with the assigned transmission opportunities.

An embodiment method includes transmitting, by a first network node to a UE, a UE specific tracking sequence and assigned transmission opportunities, and receiving, by the first network node from the UE, a tracking sequence.

An embodiment method includes receiving, by a first network node from a UE, a tracking sequence in accordance with assigned transmission opportunities and detecting the UE in accordance with the tracking sequence to produce a UE detection status. The method also includes transmitting, by the first network node to the UE, a transmission response in accordance with the UE detection status.

An embodiment user equipment (UE) includes a processor and a non-transitory computer readable storage medium storing programming for execution by the processor. The programming includes instructions to receive from a network node, a UE specific tracking sequence and assigned transmission opportunities and transmit, to the network node, the UE specific tracking sequence in accordance with the assigned transmission opportunities.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
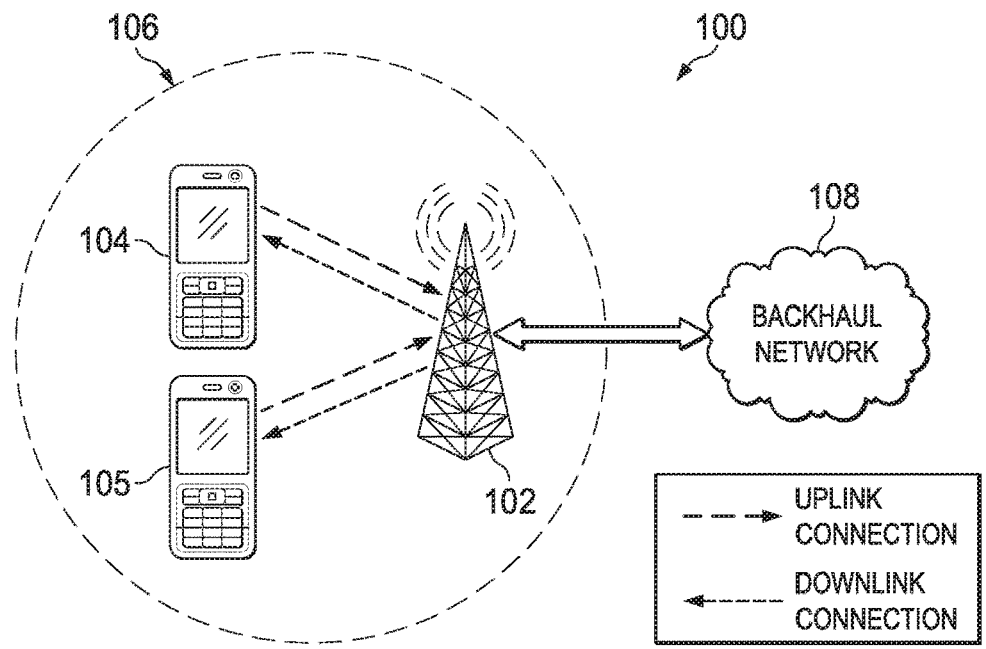
FIG. 1 illustrates a diagram of a wireless network for communicating data.

FIG. 1 illustrates network 100 for communicating data. Network 100 includes network node 102 having a coverage area 106, a plurality of user equipments (UEs), including UE 104 and UE 105, and backhaul network 108. Two UEs are depicted, but many more may be present. Network node 102 may be any component capable of providing wireless access by establishing uplink (dashed line) and/or downlink (dotted line) connections with UE 104 and UE 105, such as a base station, a NodeB, an enhanced nodeB (eNB), an access point, a picocell, a femtocell, relay node, and other wirelessly enabled devices. UE 104 and UE 105 may be any component capable of establishing a wireless connection with network node 102, such as cell phones, smart phones, tablets, sensors, etc. Backhaul network 108 may be any component or collection of components that allow data to be exchanged between network node 102 and a remote end. In some embodiments, the network 100 may include various other wireless devices, such as relays, etc.

In a fifth generation (5G) long term evolution (LTE) wireless communications system, a UE may enter a standby mode (which may also be referred to as eco mode or battery saving mode), which facilitates fast wake-up and tracking compared to an idle mode (which may be used in access networks such as LTE). In radio access virtualization, a UE registers to the network, not to a particular cell. In a 5G LTE system, a hypercell is defined and is used as the entry point for synchronization and UE registration. The connection is UE centric, where a registered UE is identified by its non-cell specific ID, and is recognized by its sequence. The UE is tracked by the network within the hypercell using this sequence. The sequence and UE identification (ID) may be based on the UE type, speed, or other factors.

In an embodiment, a tracking channel is UE specific. The UE tracking channel is UE type dependent. A UE ID and sequence are assigned to the UE, which are used in determining the resource allocation for tracking in time and frequency. In an embodiment, the tracking channel is used to automatically recognize a connected user or simplify the identification and authentication process. Contention resolution might not be necessary, because the UE is already connected to the network when it becomes associated with a hypercell. The UE ID might not be updated as the tracking channel is updated, and resynchronization is not needed. The UE ID may be changed, for example for security purposes. A tracking channel may be used to track UEs and keep the transmit point (TP) set optimized in standby (or eco) mode, while the sounding channel is used to measure UEs in an active state. A tracking sequence may be reused in the same zone, for example in a hotspot, for low speed and nomadic users. Thus, different UEs in the same hypercell, but different geographical locations, may use the same tracking sequence in the same time and frequency resource.

For tracking sequences, such as Zadoff Chu sequences, different parameters have different effects on sequence availability. Only a subset of all possible circular shifts of those sequences is available. This is in part due to the fact that the minimum respective cyclic delay between sequences will be greater than the round trip delay plus the channel time response duration. For example, with a format 0 of physical layer random access channel (PRACH) in LTE, a minimum shift of 15 chips is equivalent to almost 14 µs, or a total round trip delay plus channel impulse response time of less than 14 µs, or 4.2 km. This may support a 2 km cell radius with a very low delay spreading of the channel. With high spread channels, for example 6 µs, the maximum cell radius shrinks, for example to 1.2 km.

When a hypercell is used in a network, the radius expands further for the network node, because the network nodes in the network utilize the same set of sequences, unless the set of sequences is reassigned based on the sub-zone. A network node in the hypercell receives the uplink tracking channel (TC) from a UE which may be far from itself, and the propagation delay may produce a sufficient shift on the sequence which may lead to the node confusing the shifted version of this sequence with another circularly shifted version of the sequence. The effect of power control may become a significant factor in detecting the sequence.

In an example, where the hypercell is synchronized, and many network nodes in the network send the same synchronization signal, and the tracking channel uses the same Zadoff Chu (ZC) sequence parameters as format 0 in LTE PRACH. Also, the maximum distance of any node from the closest network node, with which it synchronizes its signal, is 300 m, which accounts for a 1 µs delay. A significant delay spreading of the channel may be caused by reflecting objects sitting 450 m from the node, leading to a total delay spreading of 3 µs. Also, a UE may provide significant interference to network nodes up to 900 meters from the UE for an additional 3 µs of delay spreading. Thus, the circular shift may be set to be larger than 7 µs, or around 8 chips. This reduces the total number of useable cyclic shifts to 104 as the sequence length in this format is 839. With a shorter circular shift, a UE may be incorrectly detected as another UE with a different sequence, which has a different cyclic shift, by a network node which is farther away. Such a false alarm may be detected and corrected by joint reception among the network nodes with additional decoding complexity. A proper power control mechanism may reduce the rate of false alarms. When the hypercell radius is reduced and effective power control is applied, the number of available cyclic shifts increases.

In a UE centric tracking channel, the UE sends its tracking sequence through the tracking channel. The network identifies the UE based on the unique tracking channel from the UE, which may include a tracking sequence incorporating UE location, and UE ID. When the UE moves, tracking information may be updated. For example, the UE location, timing advance (TA) adjustment, network node-UE association table, UE power control update, and UE ID may be updated. When there are multiple tracking failures, for example four consecutive tracking misses, the UE performs the initial access procedure to resume tracking. The tracking procedure may include paging signaling, for example for a faster downlink wakeup.

The UE sequence may be reused within a network or within a hypercell. UEs are partitioned into different groups which may have different identification processes. Examples of UE groups include sensors, fixed users, and mobile users. UE group specific tracking channels, such as sequence length, bandwidth, power control, update frequency, target miss rate, and target false alarm rate may be configured by UE group, where different UE groups have different parameters.

UEs may be categorized based on UE type. Then, the UEs are assigned UE IDs based on UE type, mobility, or other factors. Different UE groups may be allocated different parameters, such as transmission opportunities, such as time-frequency resources and period, different sequence parameters, different pool sizes, and different tracking utilization rates. Different criteria, such as acceptable miss and false alarm rates, detection complexity, and traffic type may also affect the parameters. In one example, lean timing advance tuning is used where small adjustments to the timing advance are applied for a tracked UE, to improve uplink synchronization. In another example, a mechanism for initial entry and re-entry after tracking failure is used. To detect the sequence, for example single node detection or joint node detection, may be performed.

ZC sequences of the same length may be used on the same resource set. There are a variety of parameters which are relevant to the ZC sequence. The bandwidth (BW) is the total bandwidth allocated for the sequence pool in one group in one time-frequency (TF) resource. The total time allocated for the sequence is given by:

$$T = T_S + T_{CP} + T_G,$$

where $T_s$ is the actual sequence time, $T_{CP}$ is the cyclic prefix time, and $T_G$ is the guard time at the end of the sequence. The cyclic prefix time and guard time are both more than the maximum delay of the channel plus the maximum timing mismatch. During the guard time, all UEs remain silent. The Zadoff Chu number, $N_{ZC}$, is a prime number slightly less than $BW \cdot T_S$. Each of the primary sequence time set ($T_S$, $T_{CP}$, $T_G$) may be normalized by the sequence length, e.g.:

$$T_{CP} = \left(\frac{N_{CP}}{N_{ZC}}\right) T_S.$$

The root of the sequence for different users is $R_U$, where some users may have the same root. The cyclic shift for each sequence is $CS_u$. UEs with the same root have a CS difference larger than the bandwidth times the maximum allowed total channel delay and timing mismatch $\Delta T$. A UE sequence is defined by:

$$S_u = e^{\frac{j\pi R_U (n - CS_u)(n - CS_u + 1)}{N_{ZC}}},$$

for $n = 0, \ldots, N_{ZC} - 1$. The sequence is mapped to the $T_S$. In one example, with orthogonal frequency division multiplexing (OFDM) based transmission, the carrier spacing is defined by $1/T_s$. The cyclic prefix uses the last $N_{CP}$ samples to the beginning of the sequence.

The pool size is the total number of possible sequences. The pool size is approximately given by:

$$\frac{BW \times T_S^2}{\Delta T}.$$

The above is derived due to the fact that the total possible roots are given by:

$$N_{ZC} - 1 \approx BW \times T_s,$$

and the total possible cyclic shifts are approximately given by:

$$\frac{T_S}{\Delta T}.$$

For example, in parameters similar to those used in LTE, when $N_{ZC} = 839$ and $\Delta T = 5$ µs, equivalent to almost 5 chips, a total channel dispersion and mismatch of 1.5 km, and a maximum pool size of 140,000. The pool size increases linearly with bandwidth and quadratically with time increase. The timing of the UEs may be improved by reducing $\Delta T$, which may not be less than the channel dispersion time for already connected and time adjusted UEs.

A tracking channel is based on a Zadoff Chu sequence based on a prime number $N_{ZC}$, where $N_{ZC}$ is the length of the sequence. The value of $N_{ZC}$ may be based on the assigned time and frequency resources. The total number of roots is $N_{ZC} - 1$. In LTE PRACH, $N_{ZC}$ is 839, and the total number of roots is 838. However, the orthogonality is not perfect, and the correlation between different roots is:

$$\frac{1}{\sqrt{N_{ZC}}}.$$

When $N_{ZC}$ is 839, the correlation between the different roots is 0.0345.

Power control plays a role in the number of roots. When all of the roots are used, with N different cyclic shifts around each root, there are 838N almost orthogonal sequences. In an example, each UE requires a TC transmission with an exponential distribution every T frames. When each frame is 10 µs, the average time between TCs for a UE is 10T µs. The total number of non-orthogonal TC interferences for the UE is a Poisson distributed random variable with the parameter:

$$\frac{838N}{T}.$$

The total interference measured for a sequence or for its shifted versions is a function of the actual number of UEs sending TCs, the transmitted power, and the channel between the UEs and the network nodes measuring the TC signals. When the power received by the UE in the vicinity of radius r of the network node is significant, and the overall hypercell size has a radius R, the Poisson distributed random variable of significant interference to the UE is a function of the parameter:

$$\frac{837 N r^2}{T R^2}.$$

When the parameter is large and the received power from significant interferences and the target signal are constant, the signal-to-noise ratio (SNR) of the measured delay for the target user is given by:

$$\frac{839 T R^2 P_{tap}}{837 N r^2} \cong \frac{T R^2 P_{tap}}{N r^2},$$

where $P_{tap}$ is the percentage of power received from that UE in a given tap. The SNR varies based on the tap, and is around 60% to around 70% for the most powerful taps, and smaller for less powerful taps. This $P_{tap}$ is determined by measuring only one sample using one correlation of the signal and not using any repetition or coding, unless joint decoding is performed at multiple network nodes. A high SNR, for example above about 10 dB, maintains a reasonable miss rate or false alarm rate. The maximum significant interference within radius r is limited, with relatively few UEs interfering in the vicinity for the resources.

In one example, only a fraction of the 838*839 possible signatures are used. For the cyclic shift, the number might be very small, depending on the topology and channel statistics. Roots may be reused when they are used in a large area with a relatively large radius R, and the effects of power control and path loss are such that only a small fraction of the roots exist within the interference region of each node. In a situation, such as a football stadium or an open air festival, where many users are located within a small range, the number of almost orthogonal interferences is significant. On the other hand, for a hypercell covering a building with may offices, only few users interfere with a network node detecting the tracking channel from any UE.

For example, when a UE, on average, requires a TC signaling every 100 μs and, in a stadium, there are 5000 users in the vicinity, when just one resource is allocated for each UE, the number of significant interferences is, on average, 500 users, leading to an SNR of less than 0 dB when the power concentrated in a tap is less than 60% of the total power. Also, the total number of shifts for each root, which is a small subset of the available shifts, is given by:

$$\left\lfloor \frac{N_{ZC}}{N_d} \right\rfloor,$$

where $N_d$ is the minimum allowed shift, which is determined by the maximum delay. The sequence pool is selected, and the maximum number of allowed sequences in the same sequence set, $N_{seq}$, is determined. Also, the minimum allowed shift, and the hence the number of sequences from the same root, $N_{sr}$, are determined. Additionally, the number of required roots is determined from:

$$\left\lceil \frac{N_{seq}}{N_{sr}} \right\rceil.$$

Roots are selected from the $N_{ZC}-1$ available roots. Different roots are available for neighboring hypercells. When high speed is used, some roots might not be favorable due to high sporadic correlation values at high Doppler shifts.

When bandwidth increases the number of locations for the TC increases. The total number of unique sequences may be increased by assigning multiple resources in the spectrum and dividing the UEs into different groups with different sets of resources. The tracking channel capacity increases linearly with the increase in the number of resources per subframe. When the number of resources increases, the overhead in the uplink also increases. When a network has 100,000 users to assign, it may only allocate up to 5000 per TC slot, and as a result there may be 20 different places for the TC in each 10 μs frame.

When longer TC sequences are used, a larger prime number may be used, so the TC sequence occupies more bandwidth or more time (or both) in each PRACH allocation. When bandwidth per TC sequence increases, assigning more bandwidth leads to a higher transmission power for the UEs with the same power spectral density. While, the number of possible cyclic shifts for each root does not increase, more roots may be used, because the cross-correlation between the roots decreases. When the time duration per TC sequence increases, more cyclic shifts are available for use, leading to a linear increase in the number of cyclic shifts. However, the number of available cyclic shifts does not increase, because the increase in cyclic shifts leads to higher interference from the almost orthogonal sequence.

An increase in bandwidth or an increase in time duration both increase the capacity of the TC. The increase in capacity may, however, lead to an increase in delay or in transmission power sent by the UE. Thus, the effect is similar to that of assigning multiple TCs, because both the overhead and the number of sequences increase linearly.

By tying the sequence resource of the UE to the UE ID, the UEs automatically know which resources and sequences to use for wakeup and tracking purposes. With multiple resource allocations and high bandwidths in different frequency bands, there is room for longer preamble transmissions for UEs without significantly increasing the uplink resource overhead. Different resources may be used by different groups of UE IDs to maintain a low miss rate and a low false alarm rate, while maintaining relatively low detection complexity. With groups of UEs, where the groups are based on the capabilities, mobility, location, and traffic, different types of sequences, resources, and tracking updates may be assigned to different groups of UEs.

For UE groups which are fixed, nomadic, or slow moving, the tracking sequences may be reused within the hypercell. For fixed users, the sequence may no longer be used for tracking, but may still be used for other purposes, such as keeping the UE alive or for wakeup purposes. The network and/or UE may determine that a connection is dead when multiple tracking or wakeup communications fail. When the tracking signaling fails or does not exist for a period of time, the UE is determined to be not connected to the network, and the UE enters the initialization (or re-initialization) procedures. Additionally, when a UE is determined to be no longer connected to the network, its tracking sequence and ID may be reused and assigned to a new UE in the hypercell.

When joint detection is performed, and many network nodes in the hypercell cover the same UE, each UE may be heard by multiple network nodes, which may cooperate to jointly detect the UEs. Joint detection may facilitate a lower miss rate, lower false alarm rate, lower detection complexity, and better timing adjustment of the UE. Additionally, triangulation for tracking the location of the UEs may be used instead of or in addition to the use of global positioning system (GPS) when joint detection is performed. Joint detection may also utilize neighboring zones or subzones to determine whether to update a tracking sequence.

Figure 2:
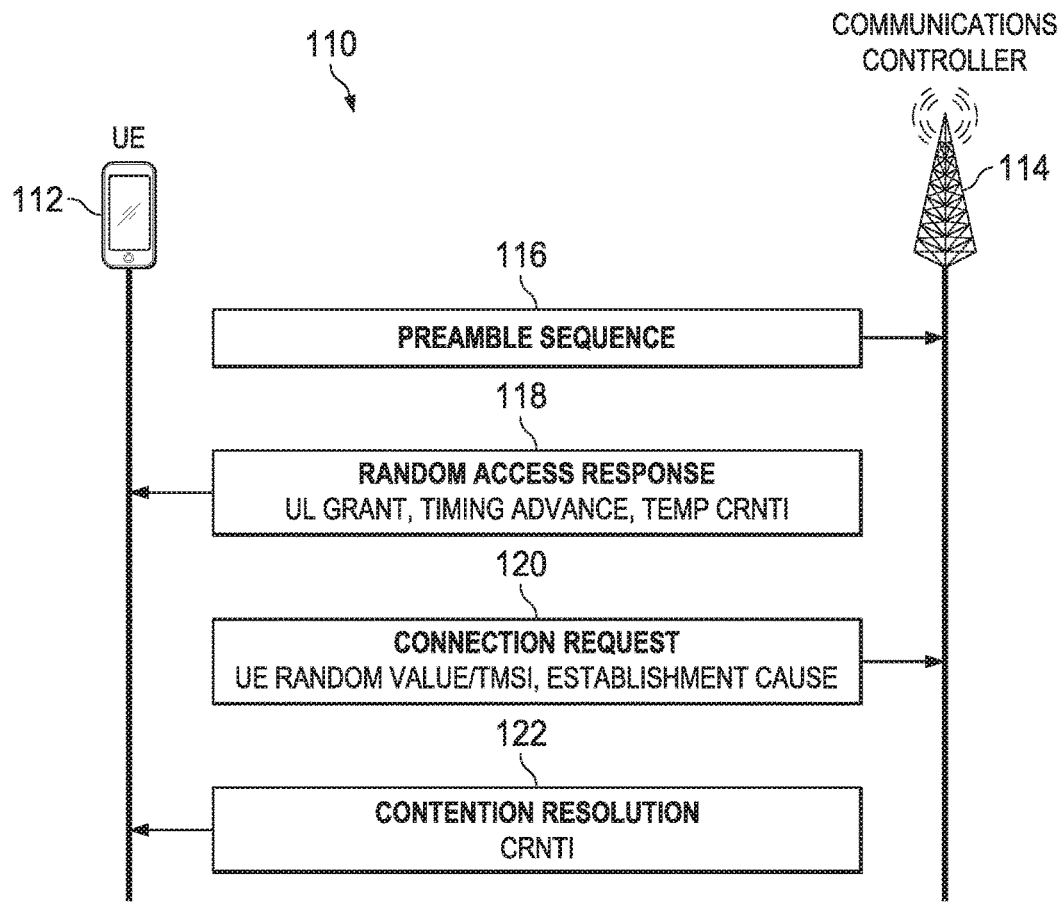
FIG. 2 illustrates a message diagram for an embodiment access procedure.

FIG. 2 illustrates message diagram 110 for an initial access procedure between UE 112 and network node 114. Initially, UE 112 selects a random access preamble sequence preamble from a pool in the target network node. The UE 112 transmits the preamble sequence to the network node 114 in message 116.

Then, in message 118, the network node 114 transmits a random access response to the UE 112 in message 118. The random access response includes an uplink (UL) grant, a timing advance adjusting, and a cell RNTI (CRNTI).

The UE 112 then uses the grant to request a connection. The UE 112 transmits a connection request to the network node 114 in message 120. The connection request includes a UE random value or total mean squared error (TMSE) and an establishment cause.

The network node 114 resolves contention, and assigns a CRNTI to the UE 112. The network node 114 transmits a contention resolution message to the UE in message 122, which includes the assigned CRNTI.

Figure 3:
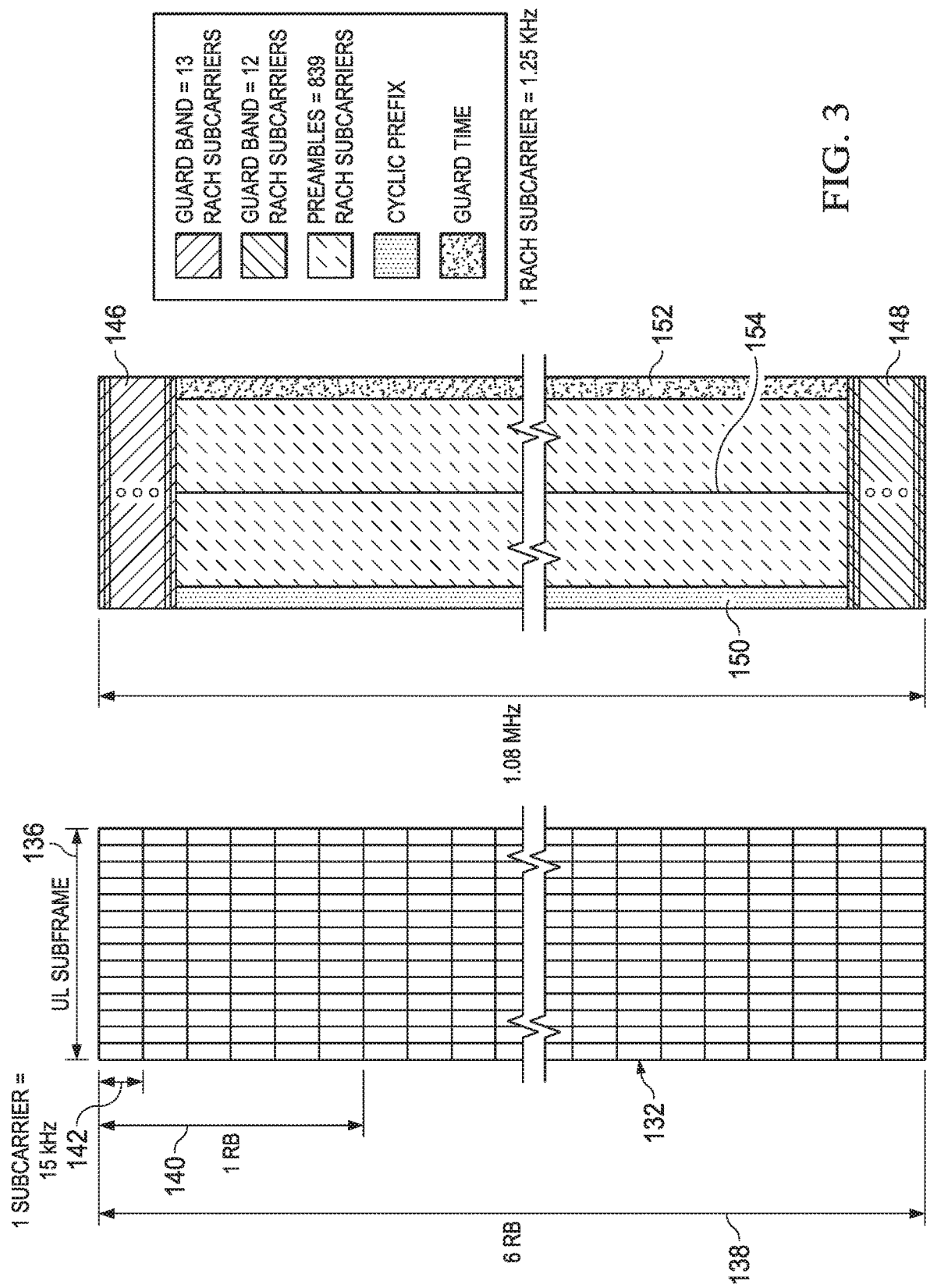
FIG. 3 illustrates an embodiment physical layer random access channel (PRACH) sequence.

FIG. 3 illustrates example PRACH sequences. A PRACH sequence may have a length of around 0.9 μs, where the sequence is extracted from a ZC sequence with a length of 839 RACH subcarriers. There are 838 different roots to the sequence, for a cross-correlation of 0.0345 among different roots of the same sequence. Also, each root may have 839 different shift values, for a total of 703,082 sequences per PRACH resource. A PRACH resource is occupied within one transmission time interval (TTI) 136 and six resource blocks (RBs) 138, for a rectangle having a size of 1 msec by 1080 kHz, or 1080 total complex degrees of freedom, or 2160 real degrees of freedom. One RB is illustrated by lines 140, and a subcarrier of 15 kHz is illustrated by line 142, in uplink subframe 132. LTE uses 10% of the space for a cyclic prefix (CP), 10% for a guard interval, and 80%, or 840 degrees of freedom, for the sequence itself for mode 0 of the PRACH. Thus, the PRACH sequences occupy six RBs in one TTI, e.g. 1 ms in Format 0. The PRACH sequences include a 0.1 ms CP 150, a 0.8 ms signal, and a 0.1 ms guard time (GT) 152. A CP of 0.1 ms and GT of 0.1 ms facilitate a cell radius of up to 15 km. Guard band 146 includes 13 RACH subcarriers, and guard band 148 includes 12 RACH subcarriers, while preamble 154 includes 839 RACH subcarriers.

Table 1, below, illustrates an example for PRACH, where there are 64 sequences per cell. There are also multiple allotted resources for PRACH in one UL frame. The allotted TF resources are determined by PRACH configuration index 0-63.

TABLE 1

| PRACH Configuration Index | Preamble Format | System Frame Number | Subframe Number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | 3 | 9 |

In LTE PRACH, there may be several considerations involved in sequence selection. Sequences are separated by the cyclic shifts and the roots. There is a correlation of 0 for different cyclic shifts for integer multiples of chip time, and a 3.5% correlation for sequences from different roots. Also, restricted sets may be selected when there are high speed users in the cell.

It is desirable to assign UEs which are located close to each other the same root but different cyclic shifts. The maximum number of UEs with the same root is determined based on the channel dispersion and timing accuracy requirement. High speed UEs may only use a subset of roots, because some roots may result in high correlations due to Doppler spreading.

A UE which seeks to synchronize with the network randomly selects a PRACH sequence from a pool, where the sequences are not associated with a particular UE. Power control and timing are based on measured downlink pathloss and timing. For PRACH detection, the cell searches for the 64 sequences and their delayed versions using correlation. When a sequence is detected, an acknowledgement signal is transmitted from a network node to a UE.

In LTE PRACH, there are 64 sequences and their delayed versions to be tested. There is a communication and processing delay when reconnection is performed. Because the sequence is not specific to the UE, additional UE identification is used, along with the assignment of a C-RNTI. When a collision occurs, contention resolution also delays the reconnection process. In an example, up to 64 UEs may establish a connection at each resource in each cell. The number of UEs may be lower, for example when high aggregate inter-sequence interference, which may be intra-cell interference or inter-cell interference, and power headroom is limited for cell edge UEs.

Figure 4:
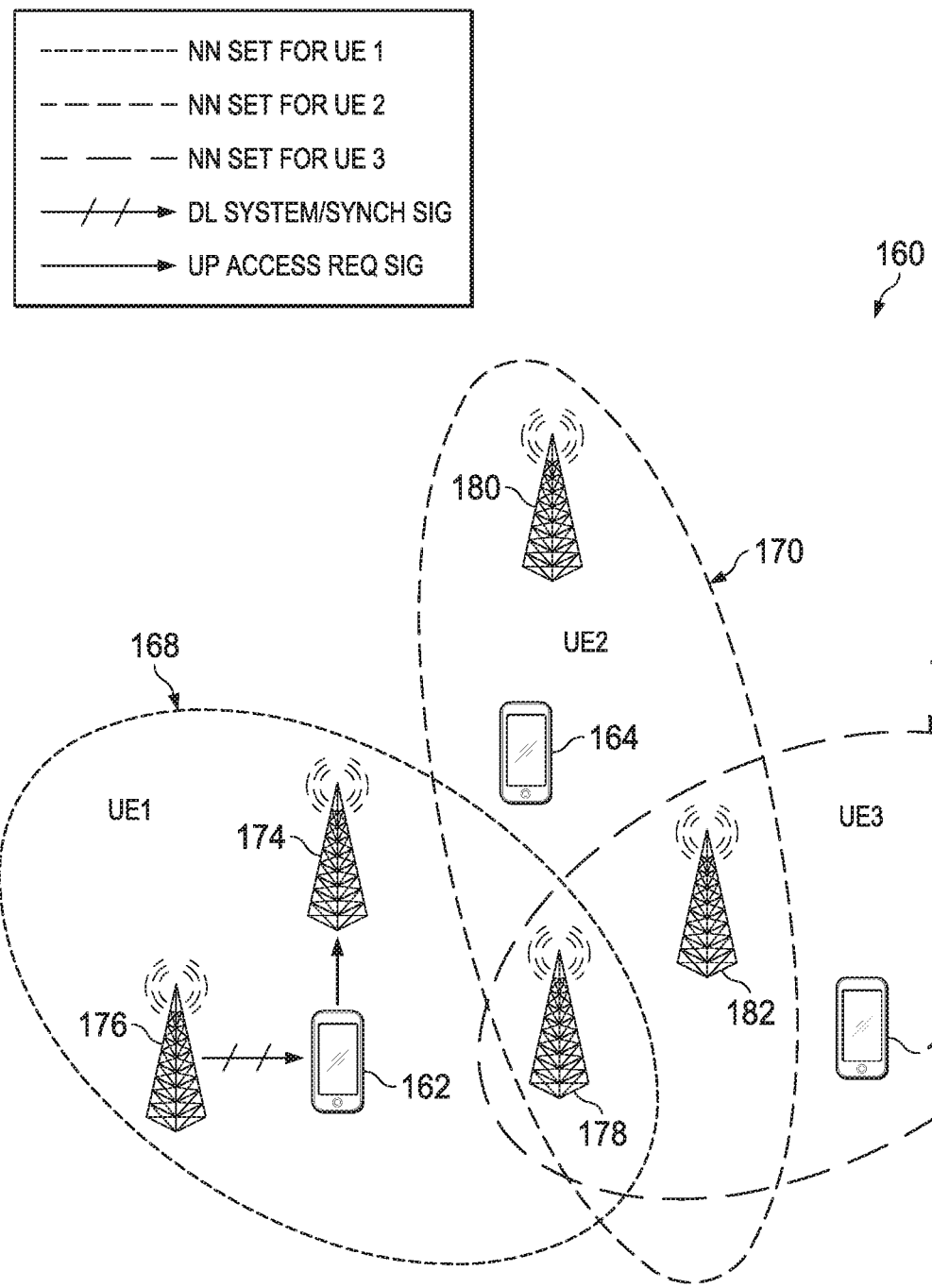
FIG. 4 illustrates an embodiment wireless network.

FIG. 4 illustrates network 160. UEs 162, 164, and 166 have network node (NN) sets 168, 170, and 172, respectively. UE 166 may connect to network nodes 178, 182, and 184 in NN set 172. Also, UE 164 may connect to network nodes 180, 182, and 178 in NN set 170. Additionally, UE 162 may connect to network nodes 174, 176, and 178 in NN set 168. In one example, UE 162 undergoes downlink (DL) and system synchronization signaling with network node 176, and undergoes uplink access request signaling with network node 174. Each UE has multiple nodes within its NN set.

In a 5G LTE network, there may be many opportunities for UE connection and identification. There are many network nodes surrounding the UE, which may listen to the preamble of the UE, leading to lower complexity and overhead for detection, lower transmission power for the uplink preamble sequence (e.g., a smaller packet loss (PL), a shorter signal round trip (e.g., closer network nodes), lower channel dispersion (e.g., more concentrated received power), and the option of joint reception. Also, more bandwidth might be available. This may lead to a lower overall uplink preamble overhead for wakeup and tracking signaling, with multiple allotted resources for uplink preamble signaling Additionally, there may be flexible parameter set-up. UEs may be categorized by, for example, type, speed, or location, where different signaling parameters are be assigned to different groups of UEs.

In an embodiment, a TC is used to facilitate "always on" for a fast wakeup of UEs. A UE may be detected using a tracking sequence. In an embodiment, UEs enter a standby mode, instead of an idle state, when not in an active state. When a UE enters a network, it remains connected and synchronized, so the random access procedure is only performed upon the initial access or after a tracking failure or a keeping alive failure. Each UE receives a unique ID within the network. The ID may be associated with a geographic zone, for example within a hypercell, which may change when the UE leaves that zone. The ID maps to a certain sequence or resource in the access channel. The UE uses the sequence to initiate a buffer status report (BSR), keep alive signaling, and synchronization refinement.

The tracking channel is used to track the location of a UE and its coordinated multipoint (CoMP) set, to keep the UE alive in the network. The tracking channel may include a UE specific sequence and a group specific TF resource. Also, for fixed or nomadic UEs, the tracking channel may include location specific detection node set. UEs in the same hypercell or near the edge of two adjacent hypercells differ in at least one component to be uniquely detectable by the network. For example, the use of the same time-frequency resource set and differing cyclic shift and root may be used for a low overhead. The UE may transition from a standby mode to an active mode, and may become active on demand. The activation frequency of the UE may depend on the traffic type and UE group. The UE tracking sequence may be activated and used periodically or pseudo-periodically to keep the UE alive and maintain tracking. A mobile UE sequence may be activated more frequently than a sensor or nomadic UE to maintain tracking. For sensors with regularly updated data, such as temperature readings, the UE may be activated with the same frequency, and at the same times, as the data update.

A network may be divided into hypercells, which may overlap. Multiple resources in frequency and time are allocated for TC in each hypercell, where the allotted resources are selected based on the expected access loading and available bandwidth. The resources may be divided into multiple groups, where each group is provisioned a set of possible sequences. The size of the set and the parameters are selected based on the expected number of simultaneous active users in a group, the number of standby users in a group, detection computational capabilities of the network, the maximum round trip delay for sequences in the group, a target miss rate, and a target false alarm rate. The access channel may include the tracking channel and the initial access channel.

In an embodiment using, there is a relatively short timing advance. When nodes are denser and have lower power, there is a lower round trip delay. In some scenarios, the timing advance may be eliminated. Differential and infrequent timing advance updates may be used for already connected low speed users. The timing advance response may include a lean timing advance setup. For example, a one bit differential or adaptive differential encoding may be used for low speed users. In an example, timing advance for sensors and nomadic users are not updated.

The pool size and resources are selected. The pool size is determined based on the total number of users in the pool, the total number of expected active UEs per access channel resource, the maximum reasonable computational complexity, the maximum round trip delay, and the maximum overhead for the allocated TF resources. There may be a limit on the maximum number of sequences in the same resource set. The complexity of detection is linearly proportional to the number of possible sequences. When there are more sequences in the pool, there is a higher false alarm rate. Also, there is a limit on the maximum number of allowed expected active users per resource, which may be based on the acceptable miss and false alarm rates. There is a non-zero correlation between different roots or cyclic shifts when delays are not integer multiples of the sampling time. The total number of expected active UEs per access channel resource affects the acceptable miss and false alarm rates. Also, there is a near-far effect caused by different PL and imperfect power controls. The resource allocation may be based on the number of groups, for example the number of UEs divided by the maximum UE pool size. The resources per group may be determined by the UE pool size times the UE activation rate divided by the maximum allowed expected active UEs.

In LTE, the minimum cyclic shift difference is limited by the maximum round trip delay and channel dispersion. Also, there may be a non-zero correlation between different roots, a non-zero correlation between different cyclic shifts with delays which are not integer multiples of sampling times, and there is a near-far effect cause by different PLs and imperfect power control. In 5G LTE, there may be a high complexity for detection, which is linearly proportional to the number of possible sequences. Also, there is a possibility of imperfect uplink power control (PC). Also, the downlink measurement in 5G networks might not be relevant to uplink PRACH power control.

A fast wakeup procedure may be used when a UE requests uplink and/or downlink resources from a standby state. The UE initiates its tracking sequence within one allotted resource. The network then detects the sequence, and responds with the appropriate resource assignment for buffer status update signaling. When there is a miss, the UE applies a timing backoff, and retransmits the sequence with possibly higher power. The backoff may be a function of traffic and quality of service (QoS) requirements. When multiple misses occur, for example four consecutive misses, the UE enters a re-synchronization status using initial access preambles or sequences. The re-synchronization signaling may be the same as the initial access procedure. Alternatively, the re-synchronization signaling is shorter than the initial access procedure.

Periodically or as needed, the access channel sequence is used to update the timing and power control of a UE. Tracking channels may be used to keep a UE alive, for uplink wakeup, and to track the location of UE. The UE may periodically or on an as-needed basis use the access channel sequence to update its timing and power control. The network may use the tracking sequence to track the UE, update a UE specific NN set, and reassign a UE ID and/or UE type for the UE. The UE may combine the tracking signaling and buffer status update for low QoS reports, such as meter updates. In the uplink wakeup procedure, the UE may transmit a preamble or tracking sequence to begin uplink when desired.

Figure 5:
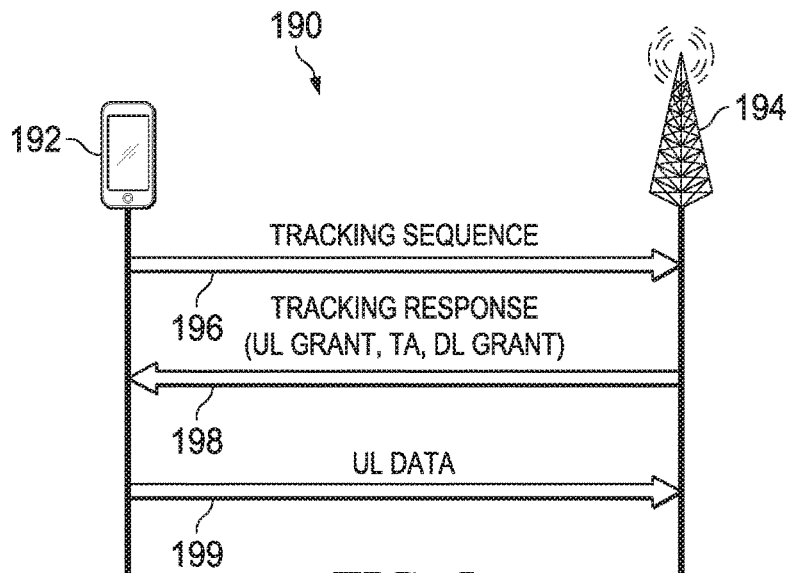
FIG. 5 illustrates a message diagram for an embodiment tracking procedure.

FIG. 5 illustrates message diagram 190 for using a tracking channel. UE 192 initially transmits a preamble sequence, a tracking sequence, to network node 194 in message 196.

Network node 194 detects the tracking sequence and identifies the UE based on the tracking sequence. The NN set associated with the UE is updated. The network node 194 responds to UE 192 with the tracking response in message 198. The tracking response may include the uplink grant, TA refinement update, and/or downlink grant. The uplink resources may be tailored based on the UE type or UE group. A downlink grant may be used when combined paging and granting is used.

UE 192 the uplinks data in message 199 to network node 194. A BSR may be appended to the uplink data. In one example, a BSR is only used to keep signaling alive, and it is not attached to uplink data.

In another tracking procedure, a UE periodically or on demand uses the access channel sequence to update its timing and power control. The network may also use this information to track the UE's locations, update the UE specific NN set, and reassign the UE ID or type. The UE combines tracking channel signaling and buffer status updates for low QoS reports, such as meter updates. The network may consider the UE to not be connected when a period of time lapses without a successful tracking channel signaling.

The NN set for a UE may be updated with or without a GPS update. Without accurate positioning information, the NN set update occurs by neighboring network nodes just outside the UE's NN set, by examining the received sequence power and delay. With pre-detection cooperation, neighboring network nodes actively detect sequences within the coverage area of neighboring network nodes. With post-detection cooperation, network nodes in the UE's NN set detect UE activity and inform the neighboring network nodes of the activity so the neighboring network nodes can track the received power and delay. Positioning may be performed using triangulation on the relative delay in the UE NN set, pinpointing the UE's location. When the NN set updates the UE position, before a UE moves out of a hypercell range, a new UE ID and sequence for the neighboring hypercell may be assigned. For low speed UEs, the UE is reassigned a new UE ID and sequence when in moves sufficiently far from the original sub-zone and/or too close to a sub-zone which uses the same tracking sequence and/or UE ID.

Different groups of UEs may have different treatments. UEs may be grouped by mobility (fixed, low speed, or high speed), and by traffic (e.g. predictable low rate, high rate traffic, smart phones). UE groups may include sensors, office machines, stadiums/open air festivals, and mobile users. Sensors may have a low data rate, may be fixed or nomadic, have low transmission power, and often have regular predictable on/off times. Sensors may have low power, with narrow BW and long times. Office machines may be nomadic, have high data rates, and have frequent active and sleep times. UEs in specific areas, such as stadiums and open air festivals may have low mobility, and might be likely to roam in small areas. Mobile users may be high speed UEs, which may be located on streets or highways. High speed UEs may be assigned wide BW, short time, and high cyclic delay differences.

TC parameter settings may be based on UE group. For example, different TC settings, such as sequence length, bandwidth, power control, update frequency, target miss rate, and target false alarm rate may be different for different UE groups. Also, there may be different sequence update criteria for different UE groups. For example, the tracking sequence update may be location based for mobile users, which may have moved too far from the last TC update.

In an example, a multi-ID field determines the UE identification, the sequence general parameters, and the UE centric tracking sequence. For example, two bits denote the UE type, where 00 indicates sensors, 01 indicates low data demand users, 10 indicates high data demand UEs, such as smart phones, and 11 indicates high speed UEs. The UE location zone also has two bits, where 00 is reserved for high speed UEs, and 01, 10, and 11 illustrate three different zones of the network, which may share the same sequence pool in different geographical locations. The UE ID field has 16 bits. Sensors may use all 16 bits, for a maximum of 64,000 UEs sharing the same sequence pool for keep alive and low usage rate purposes. Mobile users have three bits for UE group, with up to eight groups, and 13 bits for identification, for up to 8000 UEs sharing the same pool. The total number of allowed users is 1,000,000.

Figure 6:
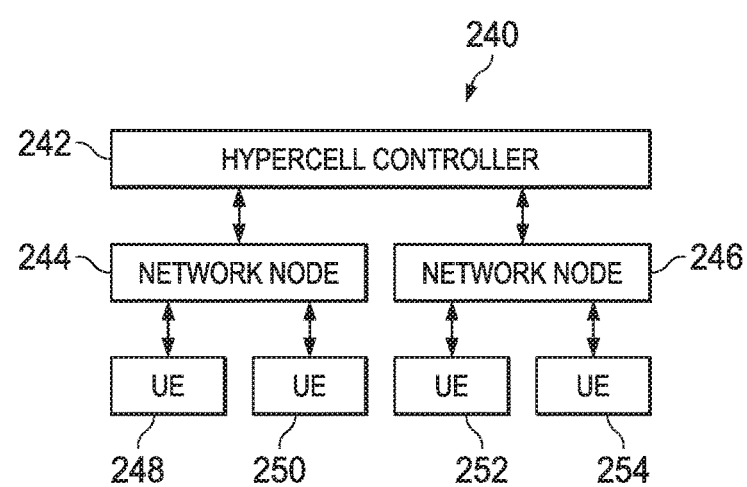
FIG. 6 illustrates another embodiment wireless network.

FIG. 6 illustrates network 240 for tracking channels, which may include a hypercell. Hypercell controller 242 communicates with network nodes within the hypercell. For example, hypercell controller 242 communicates with network nodes 244 and 246 to coordinate the tracking sequence assignments for UEs throughout the hypercell.

The network nodes communicate with the UEs. For example, network node 244 communicates with UEs 248 and 250, and network node 246 communicates with UEs 252 and 254. UEs may migrate between different network nodes in the hypercell. Two network nodes and four UEs are pictured, but many more network nodes and UEs may be used in a network.

When a UE initially enters a network, such as network 240, it is not initially assigned to a sequence. An unattached UE may use an initialization sequence which is selected from a subset of sequences reserved for this purpose. The UE is identified, and an initial timing advance signaling is communicated. The UE requests the UE ID from a network node, which forwards this response to a hypercell controller. Then, the hypercell controller assigns the UE ID and the tracking sequence or tracking sequence. The hypercell controller transmits these to the network node, which forwards them to the UE.

When a UE is connected to the network, a network node detects the tracking sequence of the UE. The tracking sequence is used to track the UE and to keep it alive in the network. The network node may request that the UE perform tasks, such as update timing information, perform a network update, or update a physical layer sequence.

In a large area, such as a hypercell, with many UEs and relatively few tracking sequences, tracking sequences are reused in different regions or zones. UEs with the same tracking sequence may be differentiated based on location. Within a hypercell, the tracking sequences for nomadic users and sensors may be reused in different locations. Nomadic users and sensors rarely move, and move slowly when they do. Their locations are known to the network, and may be maintained through tracking channels. The optimal NN set for nomadic users and sensors is stable. Sub-zones, or groups of neighboring network nodes, within the hypercell may be adopted. The sub-zones may overlap. Neighboring sub-zones use different sets of resources, for example different roots. Sub-zones which are sufficiently far to avoid interference may reuse the same sequence set, e.g. sequences from the same root. Thus, the maximum radius of the sequence detection is reduced. Also, the required minimum cyclic shift from the same root is reduced, which increases the total pool of sequences. The computational complexity may also be reduced by reducing the maximum radius. High speed users might not use zones, and may use their own specific TF resources and/or sequences.

Figure 7:
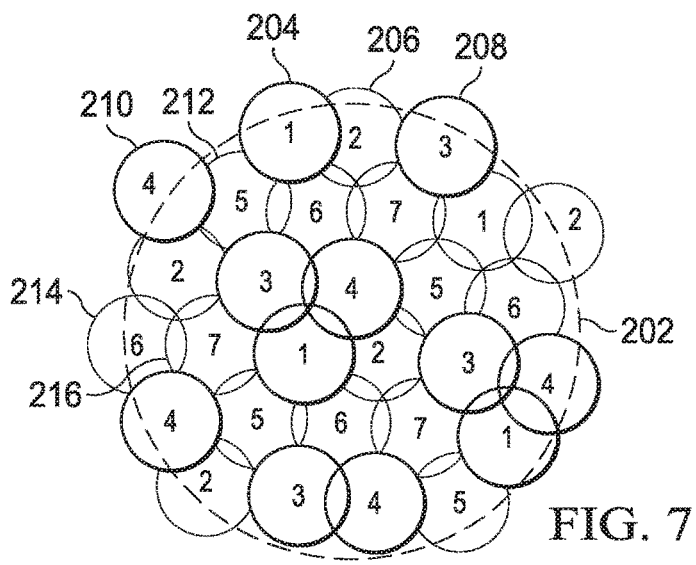
FIG. 7 illustrates an embodiment hypercell with multiple zones.

FIG. 7 illustrates hypercell coverage area 202, which is divided into seven zones, zones 204, 206, 208, 210, 212, 214, and 216. Zones with the same number are sufficiently far, and may reuse the sequence set.

Figure 8:
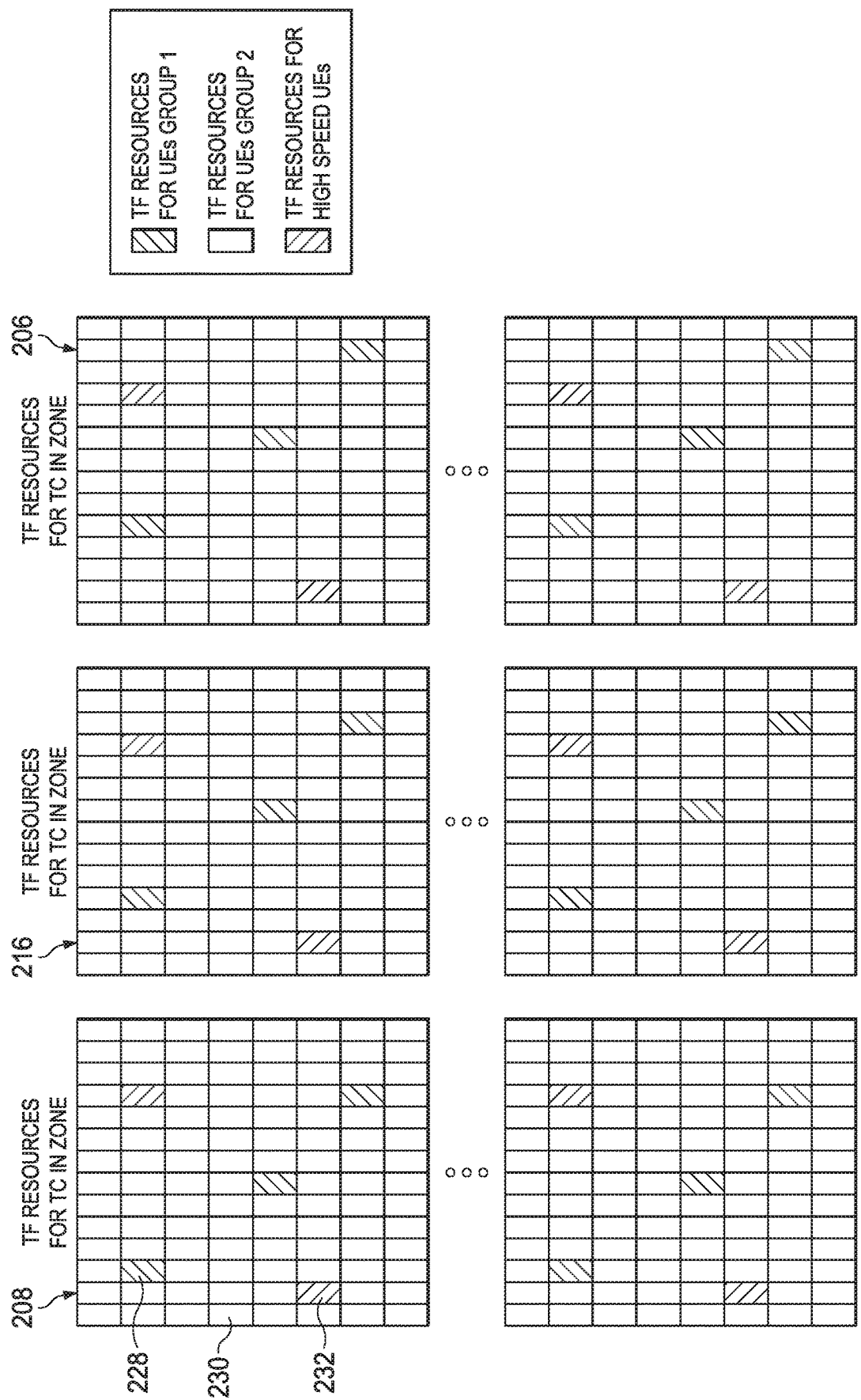
FIG. 8 illustrates time-frequency resources for multiple tracking channel zones.

FIG. 8 illustrates TF resources for TC in various zones of a hypercell, for example zones 208, 216, and 206 of hypercell coverage area 202. A zone may include TF resources for various groups, such as UE group 228, UE group 230, and high speed UE group 232. Sequences in UE group 228 may include $S_{1,0}$ $S_{1,d}$ $S_{1,2d}$ ... $S_{1,md}$ $S_{2,0}$, ..., $S_{n,md}$, sequences in UE group 230 may include $S_{n+1,0}$ $S_{n+1,d}$ ... $S_{n+1,md}$ $S_{n+2,0}$, ..., $S_{n+1,md}$, and sequences in high speed UE group 232 may include $S_{n+1+1,0}$ $S_{n+1+1,d}$ ... $S_{n+1+1,md}$ $S_{n+1+2,0}$, ..., $S_{n+1+p,md}$.

Computational complexity may be reduced by using joint node detection, location aware detection, delay aware detection, and a priori knowledge. In joint node detection, a subset of network nodes detects the presence of a tracking sequence, lowering the miss rate and false alarm rate. In location aware detection, only the presence of a sequence for UEs in the vicinity where the UE is expected is examined. Location aware detection might not be available for initial access or for high speed users. In delay aware detection, for low speed connected and synchronized nodes, the received signal delay is known, and each network node in the NN set only examines delays within a certain range. Delay aware detection, which may not be available for initial access or very high speed users, may lower complexity and reduce the false alarm rate. When using a priori knowledge for tracking purposes, the network node expects the activity after a certain period of time. This a priori knowledge may not be available for fast wakeups. In an embodiment, fewer possible sequences per resource are assigned, which reduces complexity. By only assigning a certain number of UEs to each resource, the complexity may be maintained at the expense of a longer delay for wakeup.

In an embodiment method using zones, TC sequences have a many-to-one mapping for low speed UEs, so UEs located near each other can be differentiated based on cyclic shifts only. Also, roots may be reused less often within the zones to avoid confusion between UEs in nearby zones.

To form zones, UEs are divided by type, for example into sensors, low speed devices, and high speed devices. Then, a restricted set is allocated to the high speed UEs. Different sequences and/or different TF slots are allocated to low speed UEs and sensors. Low speed UEs receive lower reuse factors and more frequent resource allocations, while resources are aggressively reused for sensors. A low speed UE may be reassigned a new tracking sequence when it moves sufficiently far from its original location, increasing the delay compared to the provisioned cyclic shift spacing.

Assigning zones may facilitate more cyclic shifts as the network nodes which are farther from a UE are unlikely to be confused by whether the signal is a long delay signal (for a UE which is very far away) or another sequence. Zoning facilitates the reuse of sequences for different parts of a hypercell. Also, zoning facilitates joint reception with low complexity, because only a subset of sequences are shared and examined. Low mobility UEs may be tracked, and sequences updated as necessary. For high mobility UEs, a subset of sequences, known as restricted sets, are assigned, and the UE only obtains a new sequence when it leaves the hypercell. Additionally, zoning does not increase the number of significantly interfering sources which may be tolerated by the receiver, and does not increase the overall number of simultaneous TC transmissions in a neighborhood within a category.

Sequences may be the similar to the ZC sequences used in LTE. The sequence length may be 839, or a larger prime number, for example 1693. The TTI length may be different in different deployments or different portions of the bandwidth for fast low-latency access with seamless handoff OFDM (f-OFDM). The length of the sequence may different in the time domain than in the frequency domain. In LTE, a TTI may be divided into 0.1 msec for a CP, 0.8 msec for the sequence, and 0.1 msec for the GT. The length of the ZC sequence, combined with the sequence portion of the TTI length, determines the sequence bandwidth. In one example, the ZC sequence used in PRACH in LTE is used.

In another example, a ZC sequence of length 997 in 6 RBs in a 1 msec TTI with a 20 µs CP and 55 µs GT is used. This may be useful for systems where the delay spread of the channel is less than 20 µs, and the maximum distance from the node is less than 6 km. This example has similar carrier spacing to PRACH in LTE.

In an additional example, a sequence length of 1693 in 6 RBs is used in a 2 msec TTI, with 40 µs CPs and 110 µs GTs. This may be useful for a system where the delay spread of the channel is less than 40 µs and the maximum distance from a node is less than 12 km. The carrier spacing is almost half of that with PRACH in LTE.

In another example, a ZC sequence length of 839 is used in 12 RBs with a 0.5 msec TTI with a 40 µs CP and a 50 µs GT. This may be useful in a system with the delay spread of the channel being less than 50 µs and the maximum distance from the node is less than 15 km. The carrier spacing is almost twice that for PRACH in LTE. A larger carrier spacing may be useful for high speed UEs.

For fully indoor usage of the system, and for indoors picocells, the length of the sequence, the CP length and GT length may be much smaller.

A system may allocate multiple resources to a network, using the same or different parameters in terms of ZC sequence length, bandwidth, and frequency in the frame. In each allocated resource, a certain group or groups of UEs are assigned with different wakeup rates and acceptable miss and false alarm probabilities. Depending on the UE distribution and the design parameters, a portion of the root and shift combinations are assigned to a pool of resources. Within a hypercell, multiple resources may be allocated, and UEs may be divided based on the allocated resources, while maintaining the miss and false alarm rates in each group.

Figure 9:
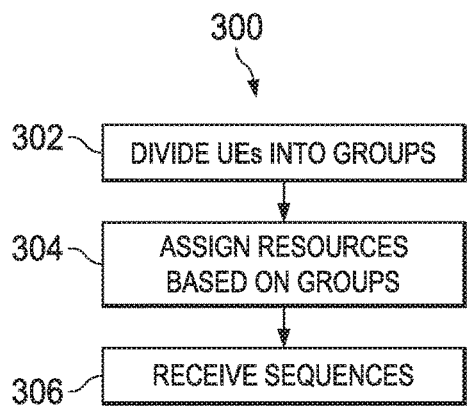
FIG. 9 illustrates a flowchart for an embodiment method of assigning tracking sequences.

FIG. 9 illustrates flowchart 300 for an embodiment method of allocating TC resources. Initially, in step 302, UEs are divided into UE groups. UEs may be divided into groups based on speed, data type, or other factors. For example, UEs are divided into three groups: low speed UEs, high speed UEs, and sensors. The TC resources are used for the UEs for tracking channels, for an access channel, and for fine tuning timing and power. There is also an initial access group, where a random sequence from a small pool is selected, which the network uses for coarse timing adjustment.

Next, in step 304, resources are assigned to each UE group. The resources may include time-frequency resources and period, for example length and bandwidth. In one example, different UE groups overlap on the time-frequency resources. Alternatively, the different groups use totally orthogonal resources.

In step 306, UEs transmit resources to the network. In each resource, a few UEs in that group transmit sequences. A UE may send the tracking sequence in a predictable manner. Alternatively, the UE sends the tracking sequence randomly.

In one example, there are 10,000 sensors in a hypercell, where each sensor has a wakeup rate of once every second. For every frame length of size 10 msec, there are, on average, 100 active sensors. When the resources for the sensors are unique to the sensors, and the average number of allowed active sequences per resource is 50 in each frame, where there are two opportunities for sensors to send their sequence. The two resource sets are assigned every 5 msec. In one example, the sensors are divided into two groups of 5000 sensors, where each group utilizes one of the resource sets. In this example, the maximum wait before a RACH opportunity is 10 msec. There is low complexity per resource and low probability for confusion between the sensors' sequences with the same root and close cyclic shifts. In another example, 10,000 unique sequences are assigned to all sensors, and the sensors select any of the resources. On average, there is the same number of active sequences per resource, and there is more complexity and a higher likelihood of confusion. However, the wait time is at most 5 msec for the next RACH opportunity. Fixed UEs, such as sensors, may only use tracking for keep-alive purposes.

For low speed UEs, the network knows the approximate locations of the UEs. In one example, low speed UEs travel at speeds of less than 36 km/hr, and only move by 1 meter every 100 ms. The hypercell is divided into subzones. Within a subzone, the low speed UEs receive sequences from some roots of the ZC sequence, where neighboring subzones use different sets of roots. Sufficiently far subzones may reuse the same sequence subset. A UE which moves far from its original subzone may acquire a new sequence. In one example with 100,000 users, for example in a stadium, there is an average wakeup time of once every second, for 1000 active users every 10 msec frame. When each network node can potentially see ¼ of the total users, and can manage and distinguish up to 25 simultaneous interferences in its vicinity while delivering the target detection criteria for its target UEs, each network node observes 250 active interferences. Ten distinct resources may be used to accommodate the interference target for each network node, for a total of 10,000 users in each group. When the total number of allowed sequences per resource is 4000, each sequence is reused three times in the stadium. Thus, the stadium is divided into zones, where the same sequences are allocated three times per resource in three different zones.

High speed UEs receive unique sequences over a large area, for example the entire hypercell, and obtain a new sequence when leaving the hypercell. For high speed UEs, the set of potential sequences may be reduced to avoid the effect of a high Doppler shift.

In single node detection, one network node in the vicinity of the UE with the highest estimated path loss attempts to detect the sequence. A node handover, where the responsibility is passed to another node, may be performed. The network node has an estimated knowledge of the expected received power for each connected UE. The UE is already time adjusted to this network node. Only a residual timing jitter caused by UE movement and synchronization drift is compensated for.

Figure 10:
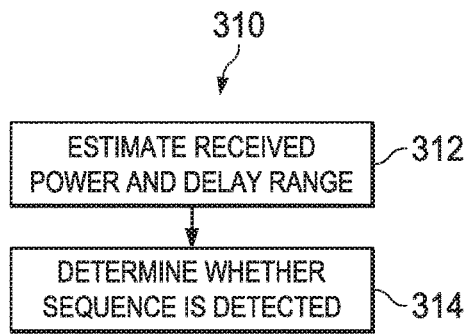
FIG. 10 illustrates a flowchart for an embodiment method of single node user equipment (UE) detection.

FIG. 10 illustrates flowchart 310 for an embodiment method of single node detection, which may be performed by a network node. Initially, in step 312, the network node estimates the UE's received power and delay range.

Next, in step 314, the network node evaluates the correlation of the received signal with the delayed version of the UE's tracking sequence within the estimated range. The network node determines the detection metric to have the highest correlation. When the detection metric is above a threshold, the sequence is marked as detected. On the other hand, when the detection metric is less than or equal to the threshold, the sequence is marked as not detected.

In joint detection, network nodes within the vicinity of the UE with the highest estimated path loss within a threshold attempt to detect the tracking sequence. A node may be added or removed from the set when the UE moves. Network nodes have an estimated knowledge of the received power for each connected UE. The UE is already time adjusted to one of the nodes, and only residual timing jitter caused by UE movement, propagation delay to different nodes, and synchronization drift are compensated for.

Figure 11:
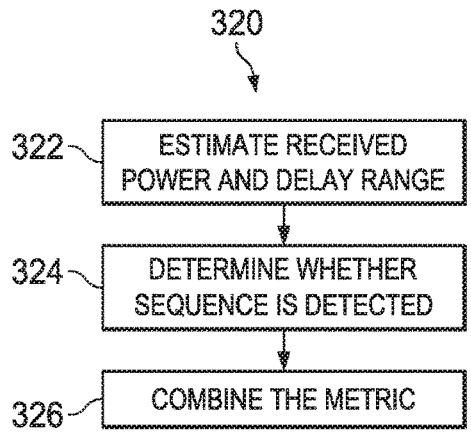
FIG. 11 illustrates a flowchart for an embodiment method of joint node UE detection.

FIG. 11 illustrates flowchart 320 for an embodiment method of joint detection, which may be performed by a network node. Initially, in step 322, the network nodes performing joint detection estimate the UE's received power and delay range. This is performed by multiple network nodes.

Next, in step 324, the network nodes evaluate the correlation of the received signal with the delayed version of the UE's sequence within the estimated range. A network node assigns the highest correlation as the detection metric.

In step 326, the network nodes combine the metric in a weighted fashion, proportional to the received power by each node. When the detection metric is above a threshold, the sequence is marked as detected. On the other hand, when the detection metric is less than or equal to the threshold, the sequence is marked as not detected.

Group tracking may be performed, where multiple UEs share a tracking channel. For example, UEs on the same vehicle may share a tracking channel. UEs in the same group may share a tracking channel, where the master node reports one tracking channel and updates the buffer statuses for all of the UEs sharing the tracking channel. A dummy UE may update the UE locations and buffer statuses of UEs in its vicinity, which may avoid tracking overhead.

Initial access UEs, which are either not connected to the network or have failed consecutive access or tracking updates, attempt to join the network. Initial access users use a small set of sequences. Different UE types may have different initial access pools. For initial access sequences, the minimum cyclic shift difference for initial access sequences is larger than those for connected sequences, because the UEs are not yet fully synchronized. A detailed response follows the initial access tracking. Upon successful authentication, a UE receives its UE ID. Some or all of the network nodes covering the entire coverage region of the hypercell listen to these transmitted TCs.

In an embodiment, an already connected UE knows its UE ID, which it uses to determine which sequence or sequences it may use for wakeup or keep alive signaling. In an embodiment, a UE already has its UE ID and the network, given a correct detection of the preamble sequence, immediately begins communications with the UE.

A tracking response acknowledges the receipt of the sequence with minimal content. In some examples, the tracking response includes more detailed information, such as a timing adjustment or power control. An embodiment may have two different types of responses, a simplified response and a detailed response. The simplified response contains only necessary information required in every response, while the detailed response contains all possible information defined in the response.

Power control may be performed based on the tracking channel. Power control may be open loop or closed loop. In open loop power control, each UE starts with a certain power. When a failure or miss occurs, the UE boosts its power for the next transmission, if there is additional available power headroom. In closed loop power control, UEs receive power control direction in a detailed tracking response. For a miss, the power for retransmission is boosted when there is additional power headroom available.

Figure 12:
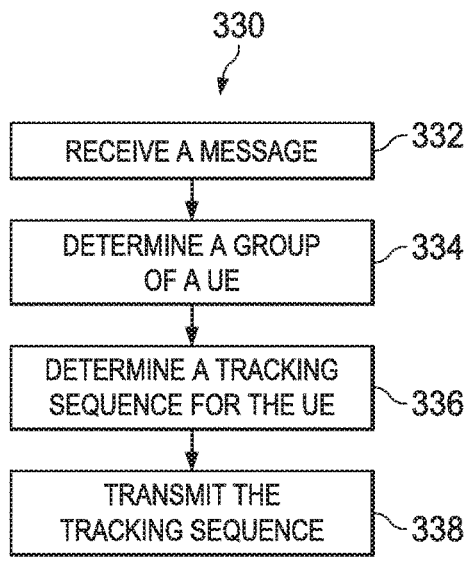
FIG. 12 illustrates a flowchart for an embodiment method of tracking channel assignment.

FIG. 12 illustrates flowchart 330 for an embodiment method of tracking channel assignment. This method may be performed by a device, such as a network node or a hypercell controller. Initially, in step 332, the device receives a message, which may include information about a UE. In one example, a network node receives the message from a UE. In another example, a hyperlink controller receives a message from a network node. In this case, the network node has received the information contained in the message from the UE.

Next, in step 334, the device determines a group of the UE based on the message. The UE groups may include sensors, slow moving UEs, or fast moving UEs. In one example, a UE group may include UEs who are likely to stay in a particular region, such as a stadium or open air festival. The UE group may be decided based on the device type, mobility, data, or other factors.

Then, in step 336, the device determines a tracking sequence for the UE based on the message received in step 332. The tracking sequence may be based on the group determined in step 334. In one example, the tracking sequence is determined based on the speed of the UE. The tracking sequence may be reused within a hypercell. For example, the tracking sequence may be used by multiple stationary or slow moving UEs located in different, for example non-adjacent, zones in a hypercell. The UE may be stationary, slow moving, or fast moving. The tracking sequence may be determined using Zadoff Chu sequence parameters, for example a Zadoff Chu prime number. In one example, the pool size of tracking sequences is determined based on the message, for example based on the UE group. Time-frequency resources may be allocated for the tracking sequence. In determining the tracking sequence, an acceptable miss rate and/or acceptable false alarm rate may be determined, for example based on the UE group. In one example, where step 336 is performed by a network node, the network node transmits a message to the hypercell controller, which may include the information received in step 332. In response, the network node receives the tracking sequence from the hypercell controller. A UE ID for the UE may also be determined in step 336. Additionally, transmission opportunities, such as time-frequency resources and period, may be determined in step 336.

In step 338, the device transmits the tracking sequence. The device may also transmit a UE ID and/or the UE group. In one example, a network node transmits the tracking sequence to the UE. In another example, a hypercell controller transmits the message to a network node, which forwards the tracking channel to the UE.

Figure 13:
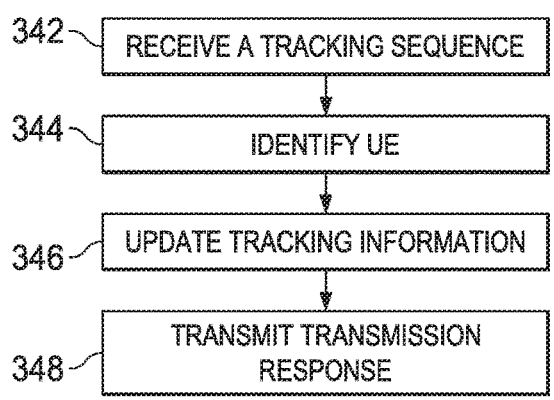
FIG. 13 illustrates a flowchart for an embodiment method of tracking channel usage.

FIG. 13 illustrates flowchart 340 for an embodiment method of using a tracking channel. Initially, in step 342, a network node receives a tracking sequence from a UE, for example over a tracking channel. The tracking sequence may be transmitted based on assigned transmission opportunities. In one example, the tracking sequence is transmitted periodically. The period for periodic transmission may depend on the speed of the UE. Alternatively, the tracking sequence is transmitted on demand. In one example, the tracking channel is shared by multiple UEs. In another embodiment, either the network node or the UE obtains a characteristic of the UE and sets a period for transmitting the tracking sequence in accordance with the characteristic of the UE. The characteristic of the UE may be one or more of a speed, a data rate, a subscribe type, or the like.

Next, in step 344, the network node identifies the UE based on the tracking sequence. The network node may use other factors, such as the delay, the location of the UE, or a priori knowledge in identifying the UE. The location of the UE may be determined using GPS or using triangulation. In one example, single node detection is performed. Alternatively, joint detection using multiple nodes in the hypercell is performed.

In step 346, the network node updates tracking information of the UE. For example, the location of the UE, the timing advance adjustment, or power control of the UE may be updated.

Finally, in step 348, the node transmits a transmission response to the UE. The transmission response may include an uplink grant or a downlink grant.

Figure 14:
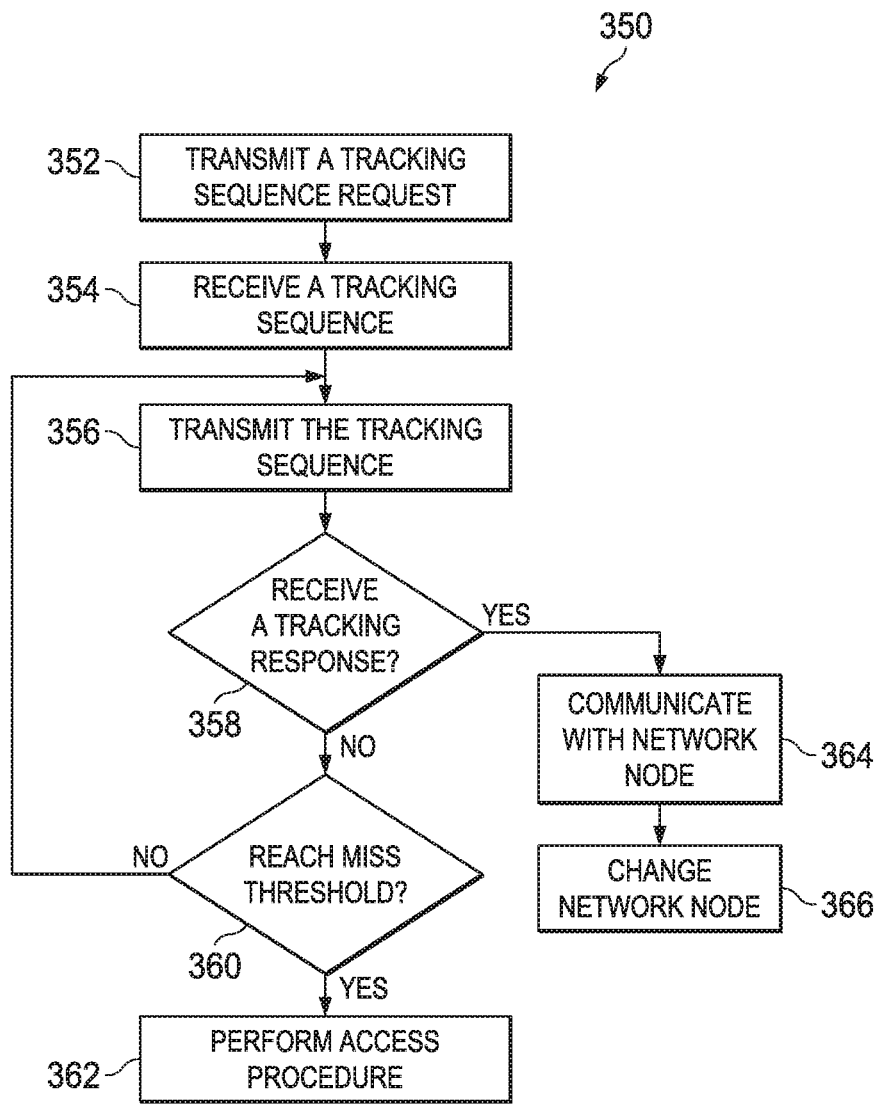
FIG. 14 illustrates a flowchart for an embodiment method of tracking channel assignment and usage.

FIG. 14 illustrates flowchart 350 for an embodiment method of assigning and using a tracking channel performed by a UE. Initially, in step 352, the UE transmits a tracking sequence request to a network node. The tracking sequence request may include an initial access sequence or an initial ID of the UE. The tracking sequence may be transmitted based on assigned transmission opportunities. In one example, the tracking sequence is transmitted periodically. The period for periodic transmission may depend on the speed of the UE. Alternatively, the tracking sequence is transmitted on demand.

In response to the tracking sequence request, in step 354, the UE receives a tracking sequence from the network node. The UE may also receive a UE ID and/or a UE group ID.

In step 356, the UE transmits the tracking sequence. The tracking sequence may be transmitted to the same network node, to a different network node, or to multiple network nodes. The tracking sequence is associated with the UE and the network or the hypercell, and not with a particular network node.

Then, in step 358, the UE determines whether it has received a tracking response within a predetermined period of time. When the UE has received a tracking response, it transitions from a standby mode to an active mode, and proceeds to step 364 to communicate with the network node. When the UE does not receive a tracking response, it proceeds to step 360.

In step 360, the UE determines whether it has reached the miss threshold. For example, the miss threshold may be four consecutive misses. When the UE has not reached the miss threshold, it proceeds to step 356 to again transmit the tracking sequence. On the other hand, when the UE has reached the miss threshold, it proceeds to step 362.

In step 362, the UE performs an access procedure. In one example, the access procedure is the same as the initial access procedure for an entirely unconnected UE. In another example, the access procedure is a shortened form of the initial access procedure.

In step 364, the UE communicates with the network node. The UE transmits and/or receives data.

In step 366, the UE changes network node. The UE may change to another network node within a hypercell and retain its tracking sequence and UE ID. When the UE changes hypercell, or moves sufficiently far within the hypercell, it may obtain a new tracking sequence and/or UE ID.

Figure 15:
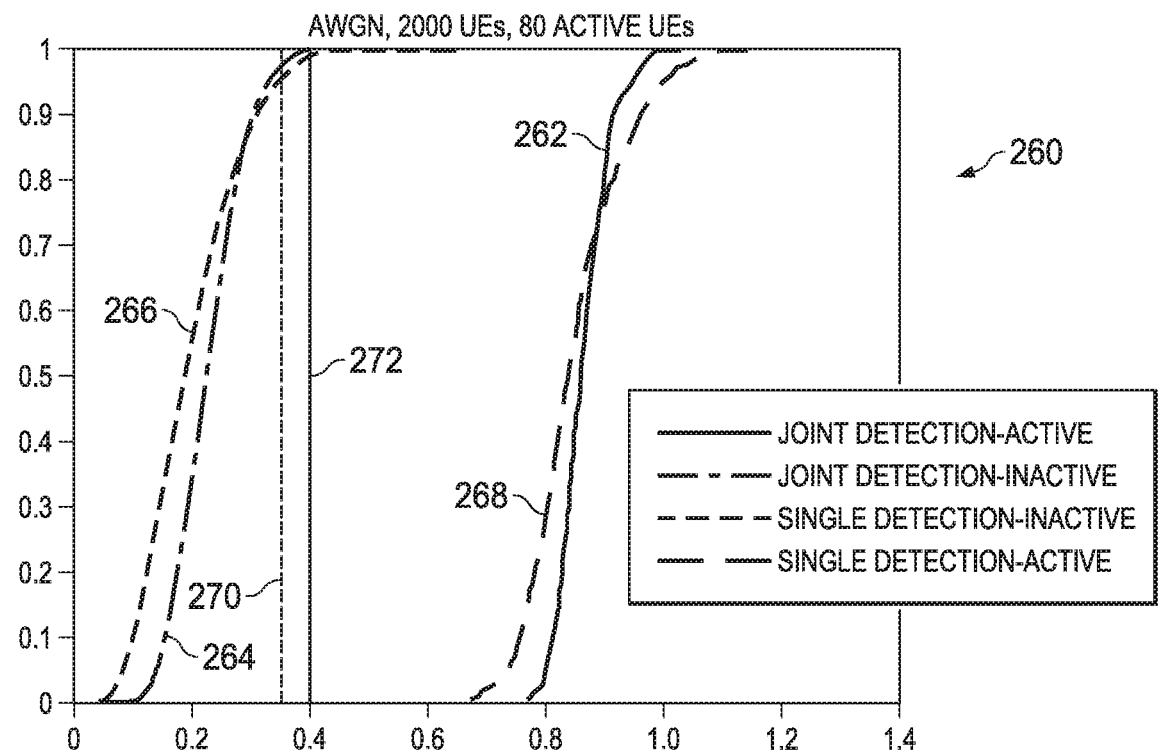
FIG. 15 illustrates a graph of cumulative density function (CDF) with additive white Gaussian noise (AWGN)
Figure 16:
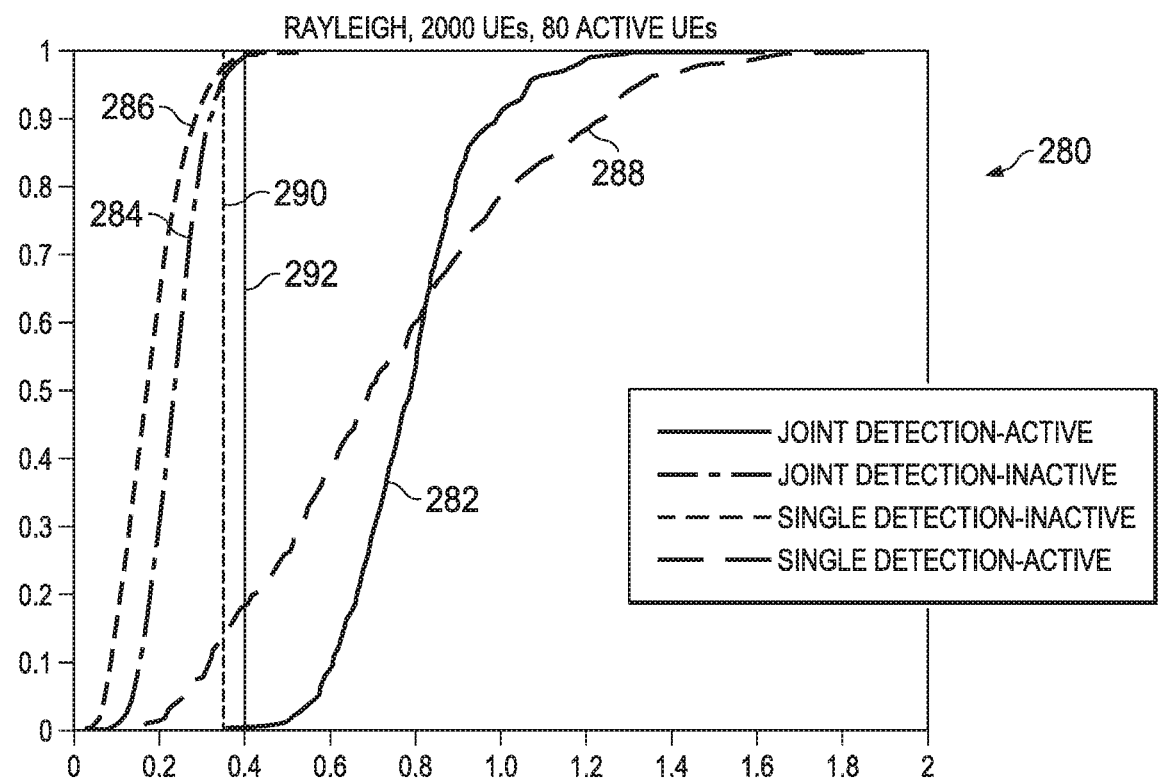
FIG. 16 illustrates a graph of CDF with Rayleigh fading.

FIGS. 15-16 illustrate graphs of performance by showing the cumulative density function (CDF) of the detection metric for active and inactive sequences for simulations. FIG. 15 illustrates graph 260 for the CDF with additive white Gaussian noise (AWGN) with 2000 UEs, including 80 active UEs. Curve 262 shows the CDF with active joint detection, curve 264 shows the CDF with inactive joint detection, curve 266 shows the CDF for inactive single detection, and curve 268 shows the CDF for active single detection. Line 270 shows the detection threshold for single detection and line 272 shows the detection threshold for joint detection.

FIG. 16 illustrates graph 280 for CDF with Rayleigh flat fading with 2000 UEs, including 80 active UEs. Curve 282 shows active joint detection, curve 284 shows inactive joint detection, curve 286 shows inactive single detection, and curve 288 shows active single detection. Line 290 shows the detection threshold for single detection and line 292 shows the detection threshold for joint detection. The false alarm metric is larger than the threshold for inactive users, and the miss metric is smaller than the threshold for active users. There are different optimal thresholds for joint node reception and single node detection. Joint detection has a steeper CDF with a lower false alarm and miss rate. The optimized threshold is based on the channel type, UE number, and active rate.

The number of active sequences has several effects on tracking channels. A larger number of active sequences increase the false alarm rate with the same detection threshold. The number of active sequences has a small impact on the miss rate. With single TP detection in AWGN channels, miss and false alarm rates may be less than 10% with 300 active UEs. With joint detection, the number of active sequences may reach more than 500 UEs with error rates of less than 10%.

The size of the sequence pool also affects performance. A larger pool size does not affect the received CDF of the active sequences when the number of active sequences does not change. The pool size has a negligible impact on the CDF for inactive sequences. The false alarm probability rate does not change, but the number of false alarms increases linearly, because more UEs are examined. When there is a 1% false alarm probability with a 10,000 sequence pool size, this leads to 100 false alarms. A high threshold may be used when more sequences are assigned to control the false alarm rate at the expense of a higher miss probability.

A system performance may be determined by the channel and the number of active users. With Rayleigh fading, the performance of single site detection may be poor, with a high miss rate due to fading. With AWGN and line of sight (LoS) channel, the performance is acceptable with lots of active users. The BW size has little impact when the number of potential UEs is relatively small.

An embodiment UE centric tracking channel is based on the UE type. The tracking resources are provisioned based on the UE type, mobility, delay requirements, detection error probability, and other factors. In an embodiment, multiple sequences which are not necessarily unique may be resolved. A unique combination of sequence, resource, and detection may involve TP set assignments to different UEs. The UE categorization may be used for sequence reuse for some types of UEs, which may be differentiated by user location or TP set. The UE positioning may use sequence detection. In an embodiment, joint detection and complexity are reduced based on UE and network knowledge. In joint detection, there is some knowledge of the UE location, which is used to detect a particular UE in locations where that UE is expected to be located.

In an embodiment, a UE ID such as a dedicated connection ID (DCID) is an ID which the UE receives as an identifier within the hypercell. In one example, the DCID is 20 bits long and includes multiple fields. The fields may include the UE type, zone, location information, and/or ID. The tracking may include user specific parameters, including the cyclic shift (CS) and root (R). The network maintains a map of all possible DCIDs and all possible tracking ZC sequences. Each DCID may be assigned a pair of CS/R values. After detecting the sequence, the network determines the CS and R values, which the network maps to the DCID of the UE. DCID to CS/R mapping may be implicit or explicit. In implicit mapping, both the network and the UE know how to derive the CS and R from the DCID, and the signaling may only include the DCID. In explicit mapping, additional signaling may be used to inform the UE of the CS/R assignment. The CS/R of a UE may change without changing the DCID of the UE. Conversely, the DCID of the UE may change without changing the CS/R of the UE.

After the UE transmits the tracking sequence, the network may respond, indicating that the tracking sequence is correct. In implicit mapping, the UE might not transmit a response. When the network does not receive a valid tracking for a period of time, it may begin a process, such as paging, to reset the user's status and re-track the UE. The UE may be aware of successful tracking by not receiving such a process. With explicit mapping, a short response or a long response may be transmitted by the network to the UE. An explicit short response may include information such as acknowledgement and/or instruction, such as timing advance fine tuning. An explicit detailed response may include a wide range of instructions, such as coarse timing advance tuning, buffer status reporting, lean paging, short packet data transmission, and/or re-authentication.

Figure 17:
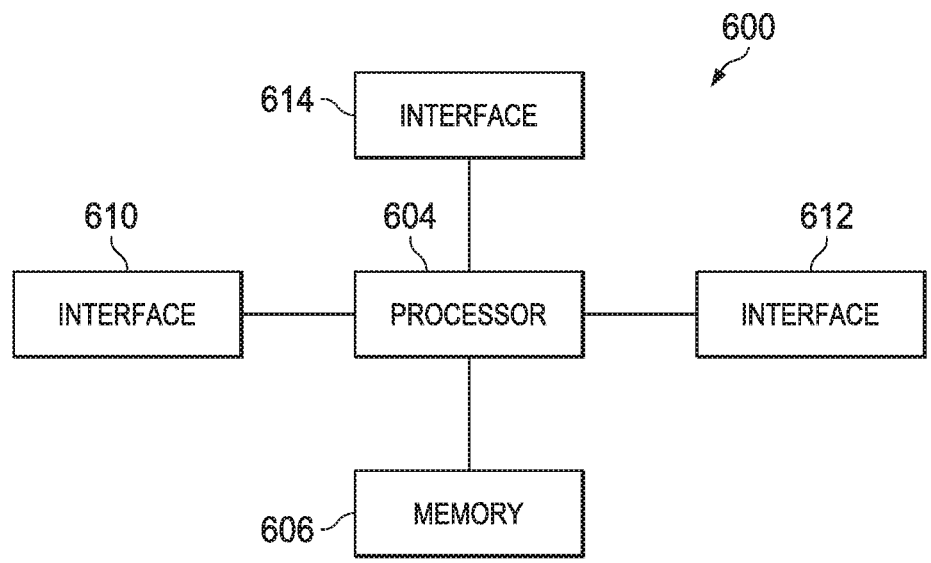
FIG. 17 illustrates a block diagram of an embodiment processing system.

FIG. 17 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 17. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 17, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 18:
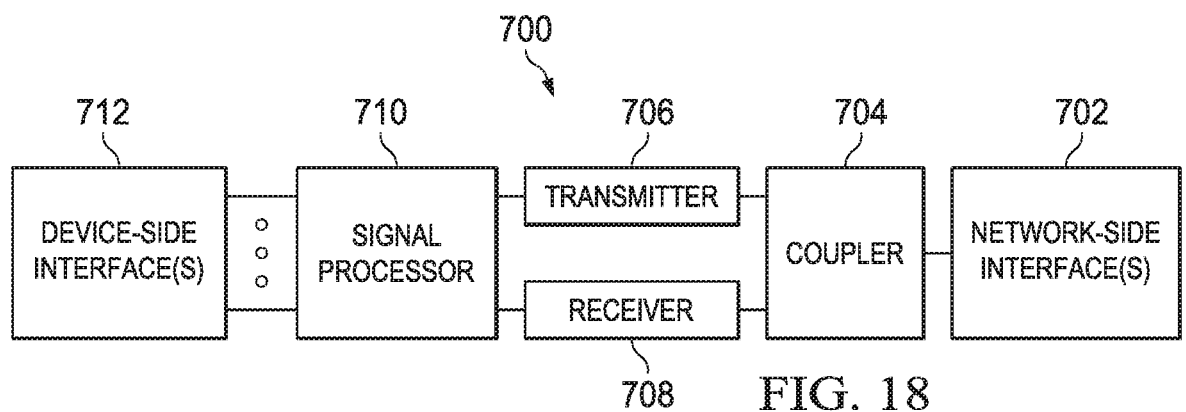
FIG. 18 illustrates a block diagram of an embodiment a transceiver.

In some embodiments, one or more of the interfaces 610, 612, 614 connects the processing system 600 to a transceiver adapted to transmit and receive signaling over the telecommunications network. FIG. 18 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
    during an initial access procedure:
       transmitting, by a user equipment (UE) in a standby mode, a tracking sequence to a network node for the network node to track the UE based on the tracking sequence, wherein the UE in the standby mode maintains its connection to the network node for reestablishing data transfer;
       receiving, by the UE from the network node, a random access response in response to the tracking sequence; and
    transmitting, by the UE in the standby mode, uplink (UL) data to the network node.

2. The method of claim 1, wherein the random access response includes a UL grant, and the transmitting the UL data comprises:
    transmitting, by the UE in the standby mode, the UL data using the UL grant in the random access response.

3. The method of claim 1, wherein the UE remains connected and synchronized with the network node while the UE is in the standby mode.

4. The method of claim 1, wherein the transmitting the UL data comprises:
    transmitting, by the UE to the network node, the UL data with a buffer status report (BSR) appended to the UL data.

5. The method of claim 1, wherein the UE is detected by the network node based on the tracking sequence.

6. The method of claim 1, further comprising:
before the transmitting the tracking sequence:
transmitting, by the UE to the network node, a tracking sequence request; and
receiving, by the UE from the network node, the tracking sequence and a unique identifier (ID), the unique ID associated with a geographic zone in a hypercell.

7. The method of claim 1, the transmitting the tracking sequence comprising:
transmitting, by the UE, the tracking sequence in a UE-centric tracking channel that uniquely identifies the UE, wherein the tracking sequence incorporates a UE location and a UE identifier (ID), and wherein the random access response includes a UL grant, a timing advance (TA) refinement update, and a downlink (DL) grant.

8. The method of claim 1, the transmitting the tracking sequence comprising:
transmitting, by the UE, the tracking sequence in a tracking channel, wherein the tracking sequence incorporates a UE identifier (ID), and wherein the random access response includes a timing advance (TA) refinement update and at least one of a UL grant or a downlink (DL) grant.

9. The method of claim 1, wherein the transmitting the UL data is before the receiving the random access response.

10. A user equipment (UE) comprising:
at least one processor; and
a non-transitory computer readable storage medium storing programming for execution by the at least one processor to cause the UE to perform operations, the operations comprising:
during an initial access procedure:
transmitting, by the UE in a standby mode, a tracking sequence to a network node for the network node to track the UE based on the tracking sequence, wherein the UE in the standby mode maintains its connection to the network node for reestablishing data transfer;
receiving, from the network node, a random access response in response to the tracking sequence; and
transmitting, by the UE in the standby mode, uplink (UL) data to the network node.

11. The UE of claim 10, wherein the random access response includes a UL grant, and the transmitting the UL data comprises:
transmitting, by the UE in the standby mode, the UL data using the UL grant in the random access response.

12. The UE of claim 10, wherein the UE remains connected and synchronized with the network node while the UE is in the standby mode.

13. The UE of claim 10, wherein the transmitting the UL data comprises:
transmitting, to the network node, the UL data with a buffer status report (BSR) appended to the UL data.

14. The UE of claim 10, wherein the UE is detected by the network node based on the tracking sequence.

15. The UE of claim 10, the operations further comprising:
before the transmitting the tracking sequence:
transmitting, to the network node, a tracking sequence request; and
receiving, from the network node, the tracking sequence and a unique identifier (ID), the unique ID associated with a geographic zone in a hypercell.

16. A method comprising:
during an initial access procedure:
receiving, by a network node from a user equipment (UE) in a standby mode, a tracking sequence for the network node to track the UE based on the tracking sequence, wherein the UE in the standby mode maintains its connection to the network node for reestablishing data transfer;
transmitting, by the network node to the UE, a random access response in response to the tracking sequence; and
receiving, by the network node from the UE in the standby mode, uplink (UL) data.

17. The method of claim 16, wherein the random access response includes a UL grant, and the receiving the UL data comprises:
receiving, by the network node, the UL data using the UL grant in the random access response.

18. The method of claim 16, wherein the UE remains connected and synchronized with the network node while the UE is in the standby mode.

19. The method of claim 16, wherein the receiving the UL data comprises:
receiving, by the network node, the UL data with a buffer status report (BSR) appended to the UL data.

20. The method of claim 16, further comprising:
detecting, by the network node, the UE based on the tracking sequence.

21. The method of claim 16, further comprising:
before the receiving the tracking sequence:
receiving, by the network node from the UE, a tracking sequence request; and
transmitting, by the network node to the UE, the tracking sequence and a unique identifier (ID), the unique ID associated with a geographic zone in a hypercell.

22. A network node comprising:
at least one processor; and
a non-transitory computer readable storage medium storing programming for execution by the at least one processor to cause the network node to perform operations, the operations comprising:
during an initial access procedure:
receiving, from a user equipment (UE) in a standby mode, a tracking sequence for the network node to track the UE based on the tracking sequence, wherein the UE in the standby mode maintains its connection to the network node for reestablishing data transfer;
transmitting, to the UE, a random access response in response to the tracking sequence; and
receiving, from the UE in the standby mode, uplink (UL) data.

23. The network node of claim 22, wherein the random access response includes a UL grant, and the receiving the UL data comprises:
receiving, by the network node, the UL data using the UL grant in the random access response.

24. The network node of claim 22, wherein the UE remains connected and synchronized with the network node while the UE is in the standby mode.

25. The network node of claim 22, wherein the receiving the UL data comprises:
receiving, by the network node, the UL data with a buffer status report (BSR) appended to the UL data.

26. The network node of claim 22, the operations further comprising:

detecting, by the network node, the UE based on the tracking sequence.

27. The network node of claim 22, the operations further comprising:

before the receiving the tracking sequence:

receiving, by the network node from the UE, a tracking sequence request; and transmitting, by the network node to the UE, the tracking sequence and a unique identifier (ID), the unique ID associated with a geographic zone in a hypercell.

* * * * *